(12) United States Patent
Subramanya

(10) Patent No.: US 10,546,497 B2
(45) Date of Patent: Jan. 28, 2020

(54) ADVANCED PARKING MANAGEMENT SYSTEM

(71) Applicant: DUNCAN PARKING TECHNOLOGIES, INC., Milwaukee, WI (US)

(72) Inventor: Balu Subramanya, Darnestown, MD (US)

(*) Notice: Subject to any disclaimer, the term of this patent is extended or adjusted under 35 U.S.C. 154(b) by 0 days.

(21) Appl. No.: 16/052,558

(22) Filed: Aug. 1, 2018

(65) Prior Publication Data

US 2019/0043356 A1    Feb. 7, 2019

Related U.S. Application Data

(60) Provisional application No. 62/539,883, filed on Aug. 1, 2017.

(51) Int. Cl.
| | |
|---|---|
| *G08G 1/14* | (2006.01) |
| *G06Q 10/02* | (2012.01) |
| *G06F 3/16* | (2006.01) |
| *H04W 4/021* | (2018.01) |
| *H04W 4/44* | (2018.01) |
| *G07B 15/02* | (2011.01) |

(52) U.S. Cl.
CPC .......... *G08G 1/148* (2013.01); *G06F 3/167* (2013.01); *G06Q 10/02* (2013.01); *G07B 15/02* (2013.01); *G08G 1/142* (2013.01); *G08G 1/144* (2013.01); *G08G 1/147* (2013.01); *H04W 4/021* (2013.01); *H04W 4/44* (2018.02); *G06Q 2240/00* (2013.01)

(58) Field of Classification Search
CPC ........ G08G 1/148; G08G 1/142; G08G 1/144; G08G 1/147; H04W 4/44; H04W 4/021; G06F 3/167; G06Q 10/02; G06Q 2240/00; G07B 15/02

See application file for complete search history.

(56) References Cited

U.S. PATENT DOCUMENTS

| | | | |
|---|---|---|---|
| 5,581,256 A * | 12/1996 | McEwan | A61B 5/0507 342/27 |
| 8,069,030 B2 | 11/2011 | Iso-Sipila et al. | |
| 8,100,799 B2 | 1/2012 | Welchko | |
| 9,194,168 B1 * | 11/2015 | Lu | E05F 15/70 |
| 9,415,753 B2 | 8/2016 | Pieronek et al. | |

(Continued)

FOREIGN PATENT DOCUMENTS

| | | |
|---|---|---|
| AU | 2014100539 | 7/2014 |
| AU | 2014259505 | 11/2014 |

(Continued)

OTHER PUBLICATIONS

International Search Report and the Written Opinion of PCT/US18/44895 dated Nov. 29, 2018.

*Primary Examiner* — Mohamed Barakat
(74) *Attorney, Agent, or Firm* — Hunton Andrews Kurth LLP

(57) ABSTRACT

A parking management system that facilitates motorist guidance, payment, violation detection, and enforcement using highly accurate space occupancy detection, unique vehicle identification and guidance displays is described. The system enables reduced time to find parking, congestion mitigation, accurate violation detection, and easier enforcement, and increased payment and enforcement revenues to cities.

18 Claims, 16 Drawing Sheets

(56) References Cited

U.S. PATENT DOCUMENTS

| | | | |
|---|---|---|---|
| 9,424,840 B1* | 8/2016 | Hart | G10L 15/22 |
| 9,666,075 B2* | 5/2017 | Davies | G08G 1/149 |
| 9,697,506 B2* | 7/2017 | Jones | G07B 15/02 |
| 9,697,651 B2* | 7/2017 | Khan | G06Q 20/3278 |
| 2013/0138314 A1* | 5/2013 | Viittala | B61L 15/0027 |
| | | | 701/70 |
| 2014/0025513 A1* | 1/2014 | Cooke | G06Q 20/3278 |
| | | | 705/17 |
| 2014/0289833 A1 | 9/2014 | Briceno et al. | |
| 2014/0309982 A1 | 10/2014 | Ricci | |
| 2015/0221139 A1 | 8/2015 | Bogaard et al. | |
| 2016/0339986 A1 | 11/2016 | Jordan et al. | |
| 2017/0206471 A1* | 7/2017 | Dermosessian | G01C 21/3679 |
| 2018/0018870 A1* | 1/2018 | Sehra | G08G 1/015 |
| 2018/0047289 A1* | 2/2018 | Quast | G08G 1/146 |

FOREIGN PATENT DOCUMENTS

| | | | | |
|---|---|---|---|---|
| EP | 0 830 618 81 | 10/2003 | | |
| GB | 2518835 | 4/2015 | | |
| GB | 2518835 A * | 4/2015 | | G07B 15/02 |
| KR | 10-2010-0107117 | 10/2010 | | |
| KR | 20100107117 A * | 10/2010 | | |

* cited by examiner

ADVANCED PARKING MANAGEMENT SYSTEM

CROSS-REFERENCE TO RELATED APPLICATIONS

This application claims priority to U.S. Provisional Patent Application No. 62/539,883, filed on Aug. 1, 2017, the entire contents of which is incorporated herein by reference.

This application contains subject matter related to U.S. patent application Ser. No. 13/464,706 (now U.S. Pat. No. 8,878,697), filed on May 4, 2012, which claims priority to U.S. Provisional Application Nos. 61/549,029, filed on Oct. 19, 2011, and 61/638,173, filed on Apr. 25, 2012, the entire contents of which are incorporated herein by reference.

This application contains subject matter elated to U.S. patent application Ser. No. 14/144,161, filed on Dec. 30, 2013, which claims priority to U.S. Provisional Application Nos. 61/746,842, filed on Dec. 28, 2012, and 61/790,209, tiled on Mar. 15, 2013, the entire contents of which are incorporated herein by reference.

This application contains subject matter related to U.S. patent application Ser. No. 14/210,846, filed on Mar. 14, 2014, which is a continuation-in-part of U.S. patent application Ser. No. 14/144,161, tiled on Dec. 30, 2013, which claims priority to U.S. Provisional Application Nos. 61/746,842, filed on Dec. 28, 2012, and 61/790,209, filed on Mar. 15, 2013, the entire contents of which are incorporated herein by reference.

BACKGROUND OF THE DISCLOSURE

Many needs of parking management, especially in on-street parking environments in urban areas, are not being met with current technology, despite severe needs to improve parking in cities around the world. The ability to automate payment for parking spaces, deserving parking spaces, especially for freely accessible spaces such as on-street parking, and provide convenient choices that combine on-street and off-street to motorists has been elusive due to limitations of current technology. Parking management systems that include accurate space occupancy detection do not include unique vehicle identification for vehicle-based parking access and rate determination, motorist guidance, violation detection, and enforcement automation support. These needs are global, have existed for a long time, but there has not been any successful implementation of a parking management system as disclosed herein.

Public parking spaces are valuable, limited and can include shared real estate. Public parking spaces impact economic development, city finances, public safety, and citizen happiness. In many cities, challenges including traffic congestion resulting from motorists circling the block due to inadequate parking supply/demand management, and the inability to incentivize beneficial use patterns and discourage abuse of public spaces results in citizen unhappiness, quality of life impact, congestion, pollution, revenue loss, economic impact to businesses, and also projects a poor image of the cities. The ability to provide motorists best-fit choices whether on-street and off-street and the ability to provide certainty of finding a parking space provides tremendous value to motorists, cities and parking operators.

Failed approaches to solving the problem of providing certainty to motorists includes electro-mechanical stoppers in each space (failures in devices damage vehicles, motorist confusion to drive over the stopper), passive RFID tags or beacons to uniquely identify vehicles (requires high powered transponders close to the tag, not compatible with battery operated parking devices), GPS based vehicle location (poor spatial accuracy, especially in dense urban areas), applications that require extensive hands-on interfaces, and inaccurate parking space occupancy detection. Due to these failures, reservations in the current art are limited to human operators facilitating the reservation and therefore are of very limited use.

Reservations capability provides a high level of certainty to motorists and becomes even more important for the very small inventory of special purpose spaces such as for EV charging or ride share vehicles.

In addition, there exists a demand for parking management of 2 wheelers and tracks.

SUMMARY OF THE DISCLOSURE

An exemplary embodiment includes a system comprising an occupancy detection sensor that is configured to detect a change in occupancy state in a parking space. The system may include a reservations indicator display configured to display a sufficiently unique identifier to indicate an identity of a reservation holder, situated in proximity to the parking space and configured to change responsive to a vehicle entering or exiting the parking space or upon authentication of the reservation holder in a reserved parking space or upon an accepted reservation. The system may include a user device including a mobile application configured to request a reservation associated with an intended parking session by inputting one or more parameters. The system may include one or more processors configured to provide information to a user device of the reservation holder regarding available or expected choices for parking for the intended parking session. The user device may be configured to select, via the mobile application, a choice for parking based on the available or expected choices for parking for the intended parking session. The one or more processors may be configured to authenticate whether a vehicle occupancy event in the reserved parking space belongs to the reservation holder for the reserved parking space. The one or more processors may be configured to manage processing of violations and exceptions upon determining that an identity of the parked vehicle in the reserved parking space cannot be confirmed.

Another exemplary embodiment includes an automated voice controlled parking assistance system, comprising a device configured to input, via voice, one or more parameters to describe a request, the requested comprising an intended parking session. The system may include one or more processors may be configured to prompt a user of the device for missing information or additional parameters needed to narrow down parking choices responsive to the input. The one or more processors may be configured to transmit information to the user regarding available or expected choices associated with parking for the intended parking session. The one or more processors may be configured to match the request to a parking inventory and provide a list of possible spaces that fit the request. The one or more processors may be configured to interface with at least one of a central parking management system and a plurality of available parking space reservation indicators to select a parking space for reservation. The one or more processors may be configured to transmit information to the device upon completion of the reservation.

Another exemplary embodiment may involve the above components and techniques for two wheeler parking.

Another exemplary embodiment may involve changing messages in a dynamic message sign in the vicinity of the parking area or its approaches.

Another exemplary embodiment may involve the above techniques for truck space parking management.

DETAILED DESCRIPTION OF THE DISCLOSURE

Figure 1:
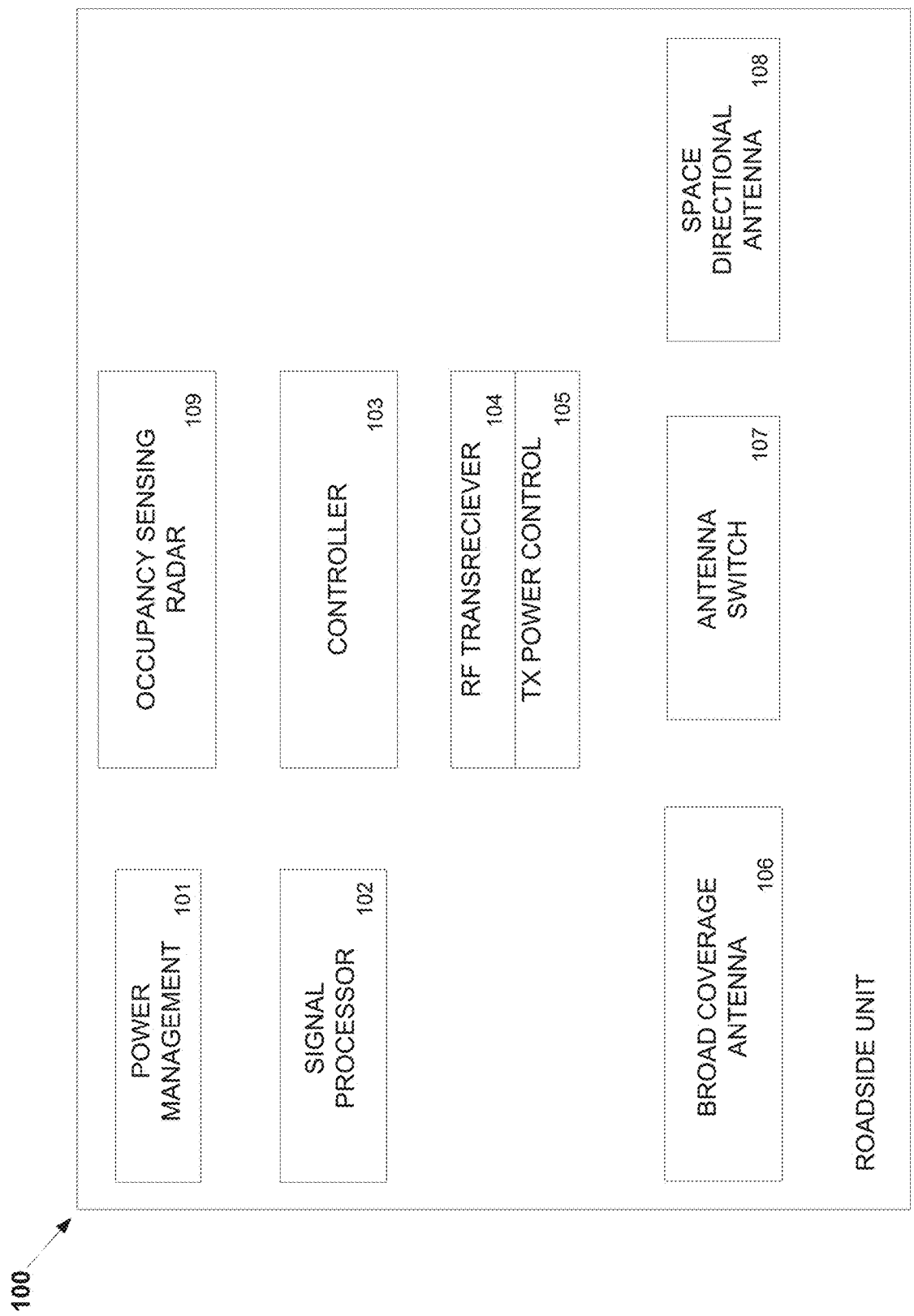
FIG. 1 depicts a schematic block diagram of a reservations indicator in accordance with an exemplary embodiment.

The following description is intended to convey a thorough understanding of the embodiments described by providing a number of specific embodiments and details of an advanced parking management system. It should be appreciated, however, that the embodiments are not limited to these specific embodiments and details, which are meant to be exemplary. It is further understood that one possessing ordinary skill in the art, in light of known systems and methods, would appreciate the use of the various embodiments for its intended purposes and benefits in any number of various embodiments, depending on specific design and other needs.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that embodiments described may be integrated into and run on a computer, which may include a programmed processing machine which has one or more processors. Such a processing machine may execute instructions stored in a memory to process the data and execute the methods described herein.

The logic herein described may be implemented by hardware, software, firmware, and/or a combination thereof. In embodiments where the logic is implemented using software, upgrades and other changes may be performed without hardware changes. The software may be embodied in a non-transitory computer readable medium.

The description herein may contain reference to wired and wireless communications paths. These wired and wireless communications paths may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Fixed Wireless Data, IEEE 802.11b, 802.15.1, 802.11n and 802.11g or any other wired or wireless network for transmitting and receiving a data signal. In various embodiments, these wired and wireless communications paths, may include, without limitation, telephone lines, fiber optics, IEEE Ethernet 902.3, a wide area network ("WAN"), a local area network ("LAN"), or a global network such as the Internet. Internet of Things (IoT) networks, or LoraWAN. Also these paths may support an Internet network, a wireless communication network, a cellular network, or the like, or any combination thereof. The communication paths may further include one network, or any number of the exemplary types of networks mentioned above, operating as a stand-alone network or in cooperation with each other which may use one or more protocols of one or more network elements to which they are communicatively coupled. Each network may translate to or from other protocols to one or more protocols of network devices. Although each path may be depicted as a single path, it should be appreciated, the path or network may comprise a plurality of interconnected networks or paths, such as, for example, the Internet, a service provider's network, a cable television network, corporate networks, and home networks.

Exemplary methods are provided herein, as there are a variety of ways to carry out the method disclosed herein. The methods depicted in the various figures may be executed or otherwise performed by one or a combination of various systems, such as described herein. Each block shown in the figures represents one or more processes, methods, and/or subroutines carried out in the exemplary methods. Each block may have an associated processing machine or the blocks depicted may be carried out through one processor machine. Furthermore, while the steps may be shown in a particular order, it should be appreciated that the steps may be conducted in a different order.

What is needed is to solve critical challenges that include providing systems and methods for accurate parking space detection, battery operated time-of-flight ranging tags to locate the precise parking space a vehicle is occupying, and on-street infrastructure that provides complete information to motorists and enables complete workflows and exception and violation management, automated natural language voice interfaces for parking management, and secondary evidence imagers to manage exception conditions and violations.

In some examples, a system may comprise a fixed unit having a sensor with a zone of detection that corresponds to at least one parking space; a reservations indicator to indicate status of the space with the ability to display specific user identifiers such as license plate or reservation holder's name or identifier; one or more processors configured to communicate between the sensor and the reservations indicator; one or more processors configured to communicate between the sensor and a central server; one or more processors configured to communicate between the reservations indicator and the central server or a user device; a mobile or in-vehicle app or user interface for a user to request a reservation or see available reservations; a natural language voice processor for convenient user interaction, especially while driving; and a guidance display indicating a number of parking spaces available in a given zone or direction, wherein the guidance display is updated based on occupancy information for each parking space collected by the roadside unit.

In some examples, a system may comprise one or more sensors configured to communicate with one or more user applications, directly or via an intermediate server, to detect arrival and parking of vehicle in a zone of detection, determine if a space is currently reserved for a reservation holder, request confirmation from the user via an indication on the user's mobile or in-car device and in case no confirmation is received, trigger exception processing that may include any one or more of alerting an operator, using secondary evidence to determine identity of the parked vehicle and state of the space, send data to one or more violations processing systems, reserve an alternative space for the valid reservation holder, change the reservations indication on an alternate space, and inform the reservation holder via an application notification, SMS or phone call about the alternate space assignment.

The systems and methods disclosed herein may apply to multi-wheeled vehicles, such as two-wheeled and/or four-wheeled motor vehicles, including automobiles, trucks, sport utility vehicles, motorbikes, mopeds, motorcycles, connected cars, autonomous vehicles, etc. As described above, a solution is needed for an integrated effort that helps build smart cities, eliminate inefficiencies, deliver high-quality services to citizens, and generate revenues. As further described herein, such a solution may include one or more of vehicle identification and management systems, guidance systems, mobile enforcement and field service systems, parking meter and space management systems, vehicle sensing systems configured to provide reliable and real-time data, comprehensive management and smart data systems, and mobile guidance applications. In addition to solving the above-identified challenges, the solution reduces risk and ensures interoperability between the various systems.

A reservation system in a non-access controlled area where non-reservation holders may access a space that requires the ability to sufficiently display the reservation state of the space, preferably a clear message that identifies the reservation holder, and the system must automatically detect when a new vehicle enters or a vehicle exits the space and change its indication based on those events, and verify the identity of the vehicle occupying the space and verify if the correct vehicle is parked in the space.

Accurate vehicle identification is a key enabling component of the reservation system. In a dense parking lot, or on the roadside, there may be other vehicles surrounding the parking space in adjacent spaces or movement lanes. Reliably identifying the vehicle in a space requires a positioning accuracy of less than 10 feet. This level of accuracy is not possible with GPS and other conventional systems, but is possible by using locating techniques, including distance measurement between a fixed device, such as a sensor, and a vehicle mounted device, such as an in-car device.

While in-vehicle devices as disclosed may solve the problem of locating and identifying a vehicle in a parking space, in-vehicle devices are sometimes expensive and it is not always possible to have the devices in all vehicles. In cases when a vehicle pulls into a reserved space without an in-vehicle device to communicate with the sensor or the reservations indicator, the correct vehicle may be verified once it has pulled into a space by asking the actual reservation holder to confirm if they pulled into the space. While this is an extra step, this may be done by transmitting a message to the reservation holder and asking the user to confirm via a user device, but it is also possible to instruct the reservation holder ahead of time to proactively confirm upon their arrival.

Enabling the parking reservations workflow via voice interaction using an automated voice processing engine, including one or more processors, will greatly assist users and enhance driver safety. Public parking systems need to cater to a wide range of users and often in areas with multi-lingual needs. For example, an intelligent voice engine may ask a user for critical information about their parking needs, prompt the user for missing information, and provide a recommendation or one or more choices to the user, and then also confirm the reservation and switch to navigation to provide directions.

As disclosed herein, the systems and methods enable advanced parking management features in a meter-less configuration, thereby potentially avoiding a large portion of capital and operating expenses to cities (in parking meters and the like), and are preferably battery operated and may be solar powered. It is expensive to trench power and data cables to various on-street equipment such as reservation indicators and sensors, though it is possible to do so. The in-vehicle device is preferably battery operated with a self-contained battery.

When used in a building, using power derived from a mains source makes it possible to power the in-vehicle device.

As disclosed herein, stationary or moving vehicles may be accurately and uniquely identified from very low power infrastructure components and display reservations indications at the parking space using battery or solar power when used in an outdoor configuration.

The disclosed systems and methods may be combined with on-street dynamic signage and guidance to motorists, and integrated with collection and enforcement systems, including booting and towing systems violating vehicles.

The disclosed systems and methods may also be suited for situations and/or environments where a vehicle needs to be uniquely identified in order to apply vehicle specific business rules for access grant, permitted length of stay, payments, discounts, accounting, etc.

In some examples, the systems and methods may be configured to detect a vehicle momentarily parked or entering an area such as a garage entrance. If the vehicle is authorized or has a reservation for a space inside the garage, the sensor and the in-vehicle device with the ranging capability may be used to detect and validate the vehicle at a gate or access point at the garage entrance and operate an access control.

In some examples, the systems and methods may have the reservations indicator collocated with a directional time of flight radar sensor or another suitable vehicle occupancy sensor that includes a defined zone of detection coinciding with a zone of interest in a parking space. Configurations, including pole mount or curb mount, may be used in this context and the sensor and the reservations indicator may share one or more of mounting structures, enclosures, battery, and communication means.

In some examples, the systems and methods may have the reservations indicator on a short pole near the space, such that it is clearly associated with the space with a LED or backlit LCD display.

While space specific indicators are less confusing to motorists, indications for 2 or more spaces in a common indicator device may be displayed. Larger dynamic message signs may comprise one or more multi-space indicators.

The in-vehicle device may be mounted at a convenient location, such as behind the windshield or the back glass of the vehicle or may be mounted on the exterior or the underside of the vehicle chassis at a suitable location. Though it is referred as in-vehicle device and may be mounted in an interior or in the vehicle, the device will have the same primary function if mounted on the exterior of the vehicle, such as attached to a license plate, license plate frame, or mounted underneath the vehicle.

The in-vehicle devices may utilize energy harvesting from ambient RF energy, light, or wind energy. The in-vehicle device may employ one or more beacons triggered periodically on a tinier or based on the vehicle state using an accelerometer to initiate handshaking or pass data to the sensor or reservations indicator.

In some examples, the systems and methods may combine any of reservations and sensor functions with a parking meter device. The parking meter may comprise a single, dual, or multi-space meter.

In some examples, the systems and methods may combine electronic payment such as NFC with a reservations indicator.

In some examples, the systems and methods may combine a passive space identifier such as RFID or 1D, 2D or 3D barcodes, or QR codes with the reservations indicator or sensor devices.

FIG. 1 depicts an example schematic block diagram of a roadside unit configuration 100. The power management section 101 may utilize a battery, solar or other suitable power source that may be shared with a parking meter or provided by a utility. The power management section 101 r ay ensure energy is being utilized optimally, the controller 103 along with the signal processor 102 work together to operate the device and process raw analog data from an occupancy sensing radar 109. In addition the RF transceiver 104 can be frequency and power level controlled internally within its own software. An antenna switch 107 may be used to share antenna elements 106, 108 with the RF transceiver 104.

The communication between the in-vehicle device and a roadside transceiver in a sensor or reservations indicator may be implemented in many ways. Battery optimization on both the in-vehicle device and the roadside device may be a significant consideration in establishing the communication mechanism.

For example, in the simplest form, the communication maybe one-way, wherein the in-vehicle device emits a beacon with its unique ID and the roadside transceiver may listen for such beacon, either constantly or periodically and in conjunction with the occupancy state change events.

The communication mechanism also may be two-way and can be initiated either by in-vehicle device or by the roadside device. The two-way communication can be implemented even if the in-vehicle device is a passive device, such as, for example, a passive RFID tag or other like passive device.

The two-way communication can enable many security schemes, such as challenge-response and other encryption schemes that can be difficult to tamper or copy. In various embodiments, the vehicle identification is used to either grant access for the vehicle or to provide treatment such as parking permits, length of stay or discounted parking, etc., as well as other fraudulent attempts that may be made to utilize these services.

To aid in initial pairing or detection of the vehicle, the in-vehicle device may transmit its identification upon an accelerometer event, such as a deceleration detection or no acceleration detection for a threshold period of time in the axis of normal vehicle movements or engage its receiver for a period of time. Upon a change of occupancy state detected by the sensor, the sensor can initiate its' receiver window for a period of time to listen to a in-vehicle device beacon or transmit a beacon if the in-vehicle device is expected to be listening.

The pairing communication may be in addition to a ranging measurement where the distance between the sensor and the in-vehicle device is measured.

Since the in-vehicle device and the sensor are on separate clocks, it is possible the clock frequencies not dissimilar. To overcome clock frequency errors, ranging may be implemented as a two-way ranging with both the in-vehicle device and the sensor measuring the ranging distance to each other and the two measurements are averaged, largely canceling out the error.

For example, the above-identified ranging may also be performed between a reservation indicator and other fixed parking devices such as a parking meter or gateway and the in-vehicle unit and the data maybe aggregated to determine the specific parking space a vehicle is in.

Ranging measurement between a transmitter and a receiver may be performed based on techniques that use a synchronization signal such as a marker pulse or a known pulse that is known by the receiver and may be used as a reference point by the receiver and techniques swept frequency transmissions with a known sweep rate, known delay timing elements, and retransmitting the original transmission or a known modification thereof. Such apriori knowledge or commonality between the transmitter and receiver and the delayed retransmission may provide adequate ranging for the purposes of localizing a vehicle in a specific spot. The localization can be further strengthened by using small temporal windows that are unique to the specific event.

Figure 2:
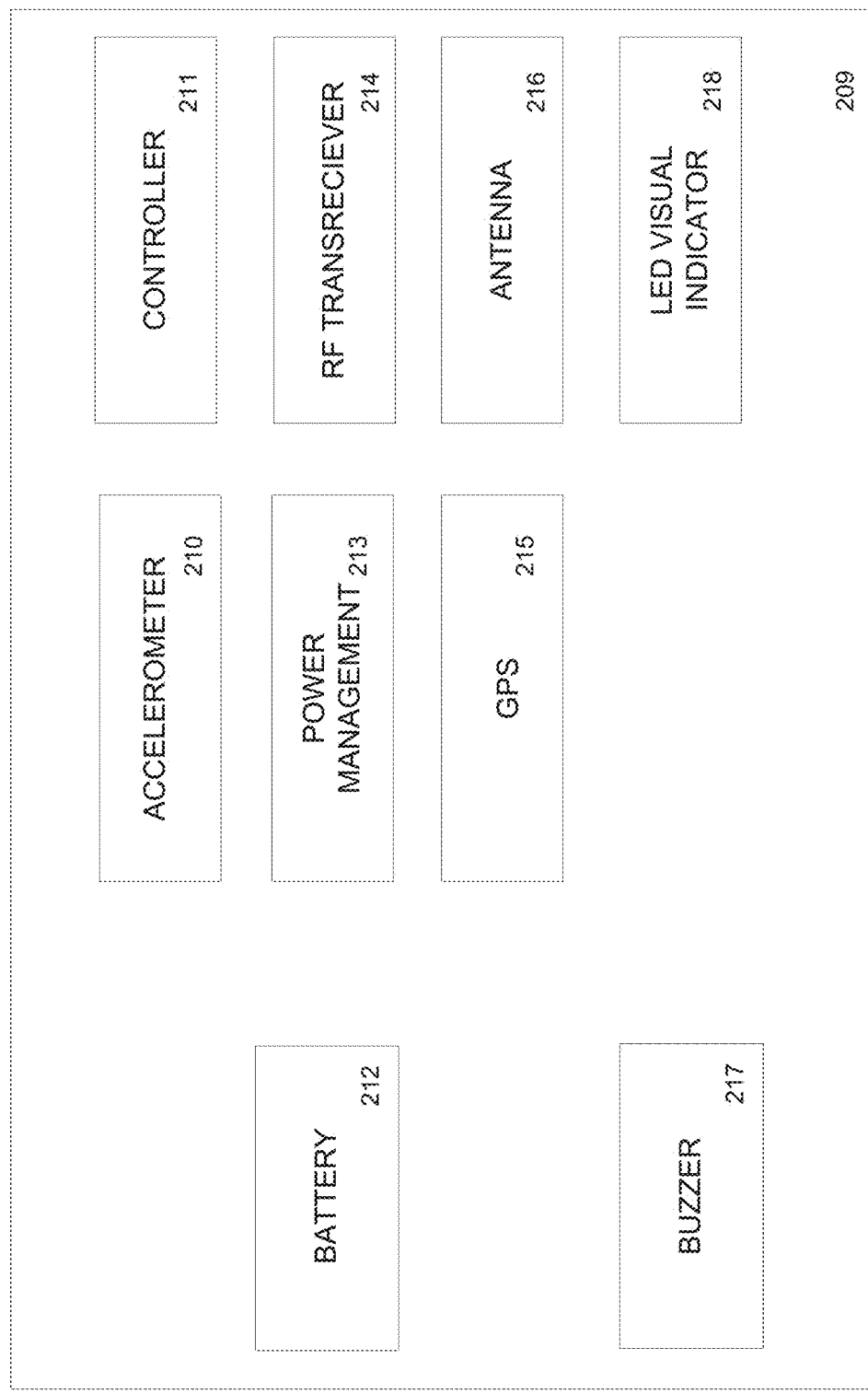
FIG. 2 depicts a schematic block diagram of an in-vehicle in accordance with an exemplary embodiment.

FIG. 2 depicts an example schematic block diagram 200 of an in-vehicle unit 209 with accelerometer 210 and optional GPS capability 215. In this example configuration, a battery 212 may provide power for the entire unit. Controller 211 may execute program instructions and may control RF transceiver 214 which couples with the antenna 216 and a visual indicator 218 and a buzzer 217.

In other examples, the in-vehicle device 209 may determine the parking state of the vehicle through an interface to a car's computer such as an OBD diagnostic interface or a Bluetooth or other wired or wireless vehicular network. In these cases, if the in-vehicle device receives a specific notification indicating the transmission has been put into a parking state or the parking brake is engaged, or the acceleration has stopped for a period of time, the in-vehicle device will receive an accurate parking event notification.

The specific determination of the location of a vehicle in a parking space by using any combination of sources from sensor event change time, vehicle acceleration data from an accelerometer or car computer data, and ranging distance measurement between the in-vehicle device and the sensor or other roadside units enable the system and methods for very reliable and suitable for general use. The use of vehicle acceleration data enables the in-vehicle device 209 to limit its transmit or receive times enabling low-power battery operation of the device 209.

In some embodiments, a button may be provided on the in-vehicle device 209 to initiate transmission to the sensor in case the initial handshaking or pairing failed. Upon pressing or activating the button, the in-vehicle device 209 may transmit a longer preamble in order to wake-up the sensor or other roadside device to ensure they can pair even if they are outside the initial pairing window. While this additional preamble takes battery power from the in-vehicle device 209, it provides the motorist an ability to force the pairing in the event there was a system error or there was an abnormal parking situation.

The in-vehicle device 209 may further include one or more of visual and auditory indications.

In other examples, the persistence of the in-vehicle device 209 with respect to the sensor or other roadside devices may be used to differentiate between vehicles in the zone of interest, such as a parked car from other nearby transitory vehicles, In various embodiments, sensors can use laser, visible, near infra-red (NIR) or infra-red (IR) light emitting diode (LED) or laser diodes, ultrasound, NIR or IR triangulation based sensors with or without a linear photo sensor array, frequency modulated continuous wave (FMCW), Doppler, inductance sensing, imaging, passive acoustic, optical disturbance or other techniques for vehicle detection.

In various embodiments, the unique vehicle identification can be used for automated payment remittance or account charges, or payments to be calculated and charged based on the time the vehicle is parked as calculated after the vehicle departs. To accomplish this, the roadside device may be communicatively coupled to one or more parking payment systems. The communicative coupling may be wireless and/or wired. In various embodiments, a cellular connection may be used. The parking payment systems may have a variety of embodiments and may be co-located with the roadside device or may be remotely located or a combination thereof For example, the parking payment system may be a parking meter or a parking pay station located at a central location to a number of parking spaces, such as, for example, in a parking garage. Also, based on the vehicle identification and the business and privacy rules set and the type of service, localized information or advertisements can be sent to an in-vehicle device or the user's cell phone or smartphone. This can be used to send reminders or other pertinent messages to the user via their smart phone, cell phone, email, tablet computing device, or other electronic means.

In various embodiments, a collection of roadside devices may listen to the in-vehicle device 209 either in a synchronized manner or not and report their signal strengths to the server and the pattern of received signal strengths can be used alone or in conjunction with other information to further narrow down the location of the in-vehicle device 209.

In various embodiments, the in-vehicle device 209 or the roadside device may incorporate a fixed delay element with an antenna element tuned to a frequency for the purposes of retransmission of the incoming signal.

In some embodiments, the delay element is longer than the transmit burst and effectively simulates a transmission path much longer than that of a physical transmission path. This allows for longer transmission pulses relative to the distance which will be easier to implement in the electronics.

In some embodiments, swept frequency transmissions are used and the frequency offset between the roadside and in-vehicle devices may be mitigated by initiating a ranging measurement from both devices, among other techniques.

In some embodiments, a synchronization signal such as a sub-microsecond burst from a gateway device that is sufficiently far and at an angle from each of the devices in a way that its signal arrives at the in-vehicle device at near the same time or with a known time lag or lead relative to the roadside device also may be incorporated into the roadside device. The sync signal starts an analog or digital timing circuit in either the roadside or the in-vehicle device and is also reflected from the other device with the fixed delay element after the fixed time delay. The time difference between the sync and the reflected signals can be measured using the analog or digital timing means as a way of determining the distance between the in-vehicle and the roadside device. If more than one roadside device participates in the timing, the information can be uploaded to a server or shared among the roadside device in order to triangulate and further precisely determine the location of the in-vehicle device in relation to the roadside device. This method can determine whether an in-vehicle device is in a near-by parked vehicle o further away transit lane. An analog timing circuit, such as a ramp voltage with a 100 ns peak-peak duration can be implemented with relative ease and the time gap between the two signals can be easily measured and can be repeated to remove spurious and noise readings. Instead of a fixed delay element, one of the devices also can be designed to transmit a burst after a preset delay. A precision timing circuit, such as those disclosed in the broad spectrum radar timing generator, also can be used for timing or the digital or analog timing circuit o the broad spectrum radar can be used for this timing.

In various embodiments, the in-vehicle 209 and/or the roadside device may use a specially adapted beacon or synchronization burst that is less than a millisecond, sometimes less than 10 µs or even less than 1 µs, that may be modulated with small amounts of data for synchronization or for broadcasting full or partial vehicle Ds. Such small bursts may be useful in saving battery life and serving as a synchronization reference may be implemented by adapting an ISM band radio transceiver, for example one primarily meant for 802.15.4 communications by hardware and/or software adaptations.

A plurality of antenna elements can be used in the roadside transceiver to narrow down the direction of arrival of the in-vehicle transceiver signals. The directional roadside transceiver antennas may also transmit predominantly in the direction of the zone of interest, reducing the chances that a stray in-vehicle transceiver may pick up its signal and respond back.

In various embodiments, the roadside devices may be synchronized precisely and measure the relative or absolute arrival time of the in-vehicle device signals and determine the location of the in-vehicle device by triangulation. The time of arrival of the leading or trailing edge of the next or subsequent in-vehicle beacon can be measured and reported by the roadside devices, or may be measured by two receiving circuits and antennas on the same roadside device. The two receiving circuits can be in the same or in nearby enclosures and are coupled electrically or wirelessly.

In various embodiments, a marker pulse from the broad spectrum radar can be used for wake-up or for location determination purposes.

The communication between the roadside and in-vehicle devices may be standards based or may use a proprietary protocol or another protocol may be used. The protocol may be further customized to keep the beacon burst very short, for example, less than one or a few milliseconds or even less than a microsecond. The beacon burst may or may not contain all the information needed for the identification. A subsequent time interval after the beacon burst may be used the two devices to signal its need to communicate further and establish two way communications to get the identification information or for authentication or security purposes.

In various embodiments, the in-vehicle device 209 may have a broad coverage and/or an omni-directional antenna. Narrow direction antennas may also be used.

In various embodiments, the in-vehicle device 209 may have visual or auditory feedback mechanism to the motorist. For example, if the vehicle's identification was recognized by the roadside sensor, and LED and/or a buzzer may flash. To conserve battery, the LED may be designed to flash say rapidly for an initial time period and then less rapidly as long as the vehicle is within range of the roadside sensor and the LED may be switched off or have a different period at other times.

In various embodiments, the in-vehicle device 209 may include one or more buttons for receiving user input from a device, such as a user device. If for some reason, the initial vehicle identification fails, the user may press or activate one of the buttons to recommence the sync process. Upon a manual initiated sync process, the in-vehicle device may transmit a long preamble to wakeup the roadside device in case it is not already listening.

In some embodiments, after the vehicle has been identified, a notification such as via an application of a user device, or by SMS or phone call may be sent to a user device indicating that parking was recognized and details related to the parking space, such as location, regulations, rates, and billing and payment details.

In various embodiments, the roadside device may signal the in-vehicle device in order to set the LED rate and duration and the period of such flashing.

Figure 3:
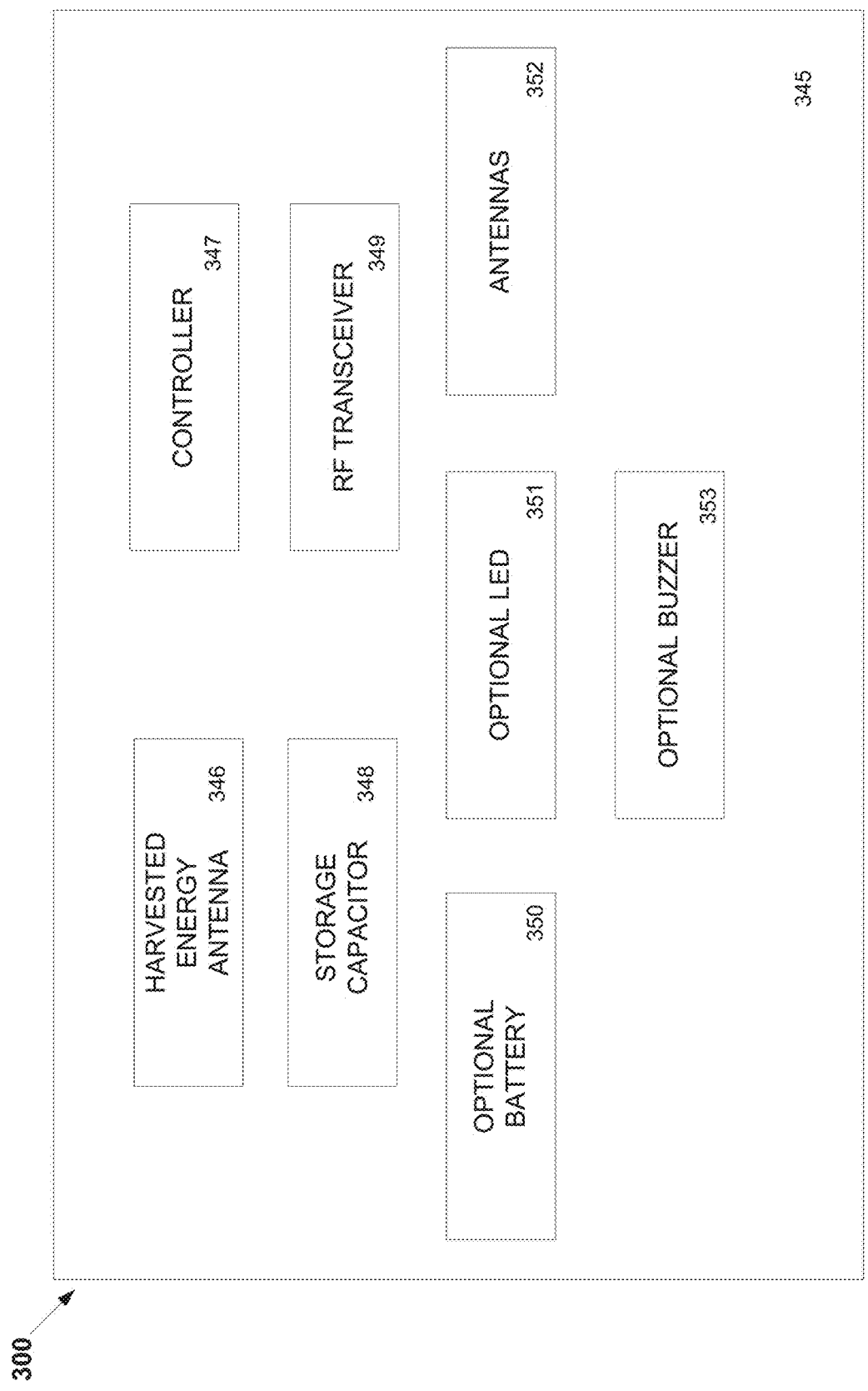
FIG. 3 depicts a schematic block diagram of an in-vehicle device with energy harvesting and mounted on an exterior of a vehicle in accordance with an exemplary embodiment.

FIG. 3 depicts an example schematic block diagram 300 of an in-vehicle device 345 with a harvested energy antenna 346 to fully or partially power the device. Storage capacitor 348 is used to temporarily store the harvested energy. Controller 347 may use RF transceiver 349 coupled with antenna 352 to communicate with the roadside device and control the visual indicator 351 and optional auditory indicator 353. An optional battery 350 can be used where needed to supplement the harvested energy stored in the capacitor 348.

In various embodiments, the vehicle identification may be provided to a parking meter or access control device or similar for applying suitable business rules associated with that vehicle. The vehicle identification also can be provided to handheld or vehicle mounted enforcement or surveillance systems. In some applications, automated camera devices may be used.

Figure 4:
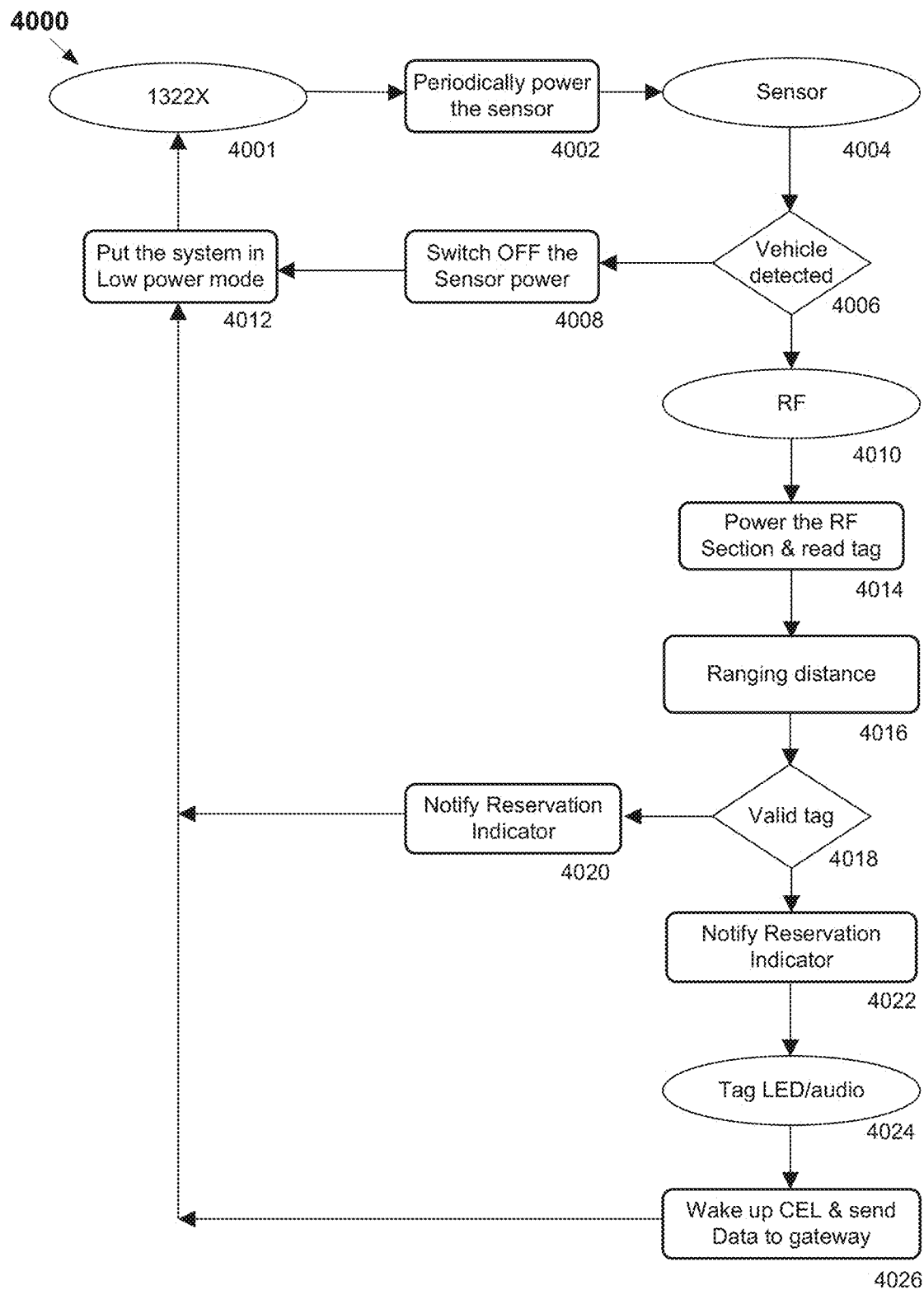
FIG. 4 depicts a flowchart of a sensor in accordance with an exemplary embodiment. For example, at block 4002 periodic power may be provided to sensor at block 4004. At block 4006, a vehicle may be detected. In the event no vehicle is detected, sensor power may be switched off at block 4008 and the system may be set to a low power mode at block 4012 before returning to the beginning 4001 of sensor operation. In the event a vehicle is detected, the method may proceed to block RF 4010 and block 4014 in which the RF section is powered and a tag (as described herein) is read. At block 4016, ranging distance measurement (as described herein) may be determined in order to determine if the tag is valid at block 4018. If the tag is not valid, reservation indicator is notified at block 4020 and the method returns to block 4012 to set the system in low-power mode. If a valid tag is detected, the method proceeds to notify reservation indicator at block 4022. At block 4024, tag LED/audio (as described herein) is determined. At block 4026, CEL is woken up and data is transmitted to a gateway (as described herein) and thereafter returning to set the system in low-power mode at block 4012.

FIG. 4 depicts a flowchart of a sensor in accordance with an exemplary embodiment. The reservations indicator is updated based on the sensor occupancy state changes as well upon changes to the reservations. The indicator may display information that can identify the reservation holder.

Figure 5:
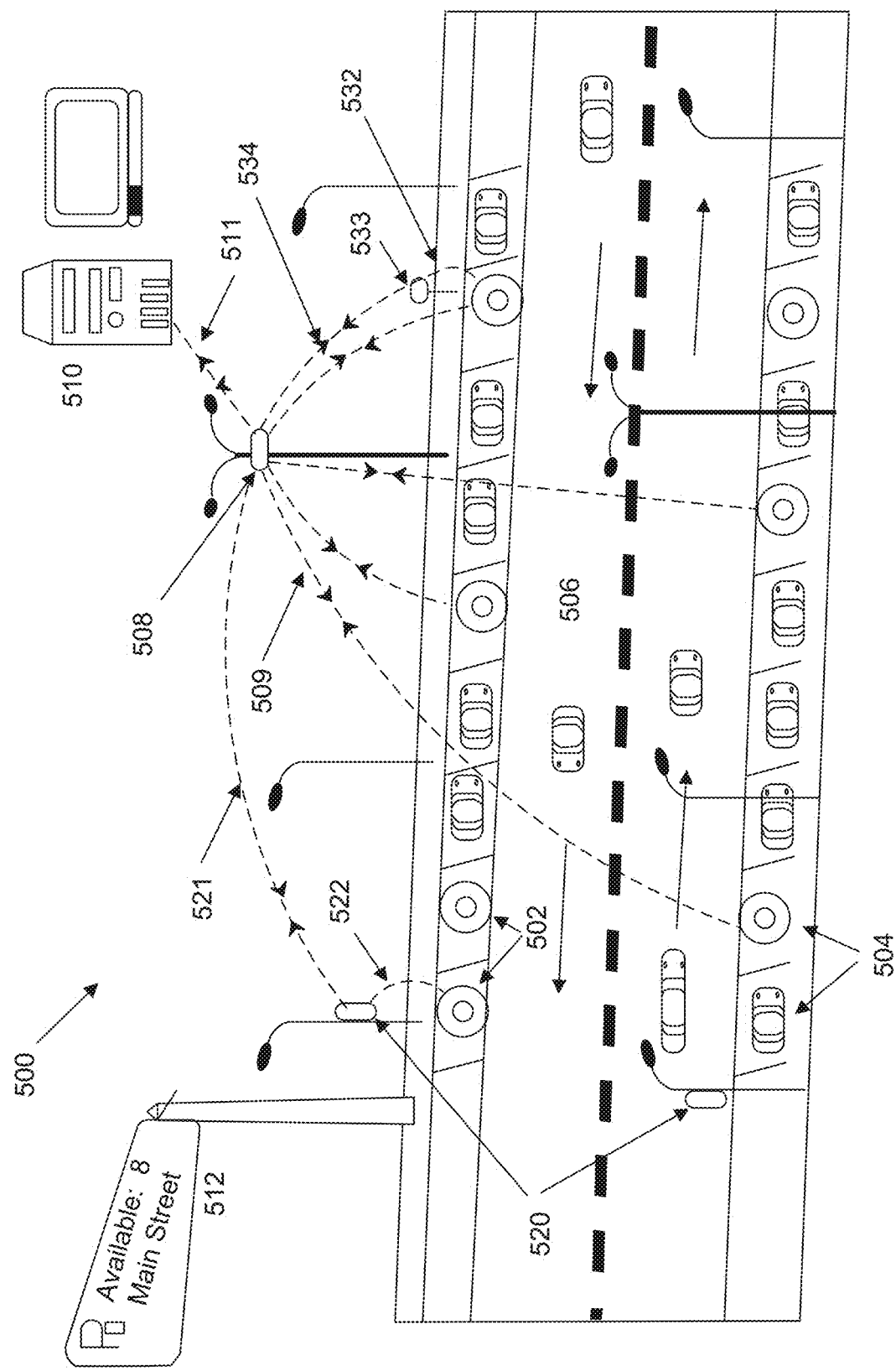
FIG. 5 depicts an architecture view of parking management components in accordance with an exemplary embodiment.

FIG. 5 depicts an on-street parking system 500 in accordance with an exemplary embodiment including wireless curb mounted sensors, gateways, guidance displays, wireless communications, and a backend computer. The system 500 may have a series of sensors 502. Each sensor 502 may be located in or adjacent to a respective parking spot 504 along a road 506. The sensors 502 may be located such that each has a zone of interest corresponding to the respective adjacent parking space (e.g., 504) that is along a road (e.g., 506). It should be appreciated that only a portion of the sensors and parking spots are labeled in FIG. 5. Each sensor 502 may be configured to sense the presence of a vehicle in the respective parking spot 504. In various embodiments, the sensor 502 may sense a tag associated with the vehicle. Both tags and vehicles also may be sensed. The sensors 502 may be located on or near a curb face or on the curb or the sidewalk. It should be appreciated that a variety of such locations are possible consistent with the embodiments disclosed herein.

Each sensor 502 may be communicatively coupled to a gateway 508. The coupling 509 may be two way and may be wireless. The gateway 508 may be communicatively coupled to a server 510. The coupling 511 may be two way and may be wireless. In various embodiments, the wireless coupling may be over a cellular network or ISM. The coupling 509 and 511 may both be cellular. In certain embodiments, the coupling 511 may be cellular and the coupling 509 may be another type of wireless signal, such as 802.1. Sensors located closer from the gateway 508 may serve as relay points for sensors located further from the gateway. Repeaters also may be used to receive and retransmit or repeat the signal for sensors located further away from the gateway. A set of wired connections also may be used for the transmission of data. The gateway 508 may be capable of sending data to each of the sensors. For example, the gateway 508 may be able to interrogate the status of an individual sensor and/or send instructions to the sensor, such as to power down. Likewise, the server 510 may send data and instructions to the gateway. The gateway may relay such data and instructions, as appropriate, the sensors.

Each sensor 502 may be communicatively coupled (i.e., either wirelessly or wired) at 532 with a roadside payment mechanism, such as parking meter 530. It should be appreciated that each parking space 504 may have a parking meter associated therewith and only one is shown for illustrative purposes. In various embodiments, a parking meter may comprise exterior casing and a removable module for both two-wheeled and four-wheeled vehicle spaces. In various embodiments, a parking meter may serve multiple spaces and may be communicatively coupled with the respective sensor(s) for each parking space the sensor serves. A common parking meter or roadside payment mechanism also may serve the entire set of spaces. It should further be appreciated that the term parking meter is meant to be non-limiting and inclusive of different roadside payment mechanisms, such as payment stations. The parking meter 530 may be communicatively coupled with the gateway 508 (as depicted at 534). In various embodiments, the parking meter 530 may use the links 509 for this connection (sending and receiving data through the sensor). Through the gateway, the parking meter may then communicatively couple with the server 510.

It should be appreciated that the gate y be replaced by or used in addition to a cellular tower or a parking meter. For example, the parking meter 530 may incorporate the gateway or may serve as the gateway. A combination of these may be used. It should also be appreciated that even though a single gateway 508 is depicted, there may be more than one gateway (or tower or parking meter). In various embodiments, cellular towers) may be used as a relay point for the data transmission from the sensors.

A display 512 may indicate the number of available parking spaces. The display 512 may indicate real-time information. It should be appreciated that the display 512 may be located on both sides of the road 506 and display the available parking spaces for a particular side. In various embodiments, such as depicted in FIG. 5, the display 512 may display the total number of available spaces for the road 506. The display 512 may provide the direction of the available parking spaces as described herein. The display may be configured consistent with the embodiments described herein. For example, the display 512 can show the number of open spaces and have a separate indication when no spaces are open and when data in not available. The display 512 can use, for example, a single 7 segment display for each direction of travel using either electromagnetic flip segments (which do not consume any power for the segments unless there is a state change) with highly reflective and visible coatings or can use LED or other suitable electronic-ink or bi-stable liquid crystal displays (LCD) displays. The advantage of using a low power display such as flip dot, flip segment, electronic-ink, bi-stable LCD, etc., is that the display mechanism can be solar or battery powered, which may be a benefit for cities where access to continuous power in light poles is cumbersome or expensive or collocating the display units with power source involves tradeoffs.

Additionally, as described herein, an imaging system may be combined with the parking systems 500 to provide imaging capability to facilitate parking enforcement operations. For example, one or more imaging devices 520 may be installed at various locations near the parking spaces such that each parking space may have coverage from at least one imaging device. The imaging devices 520 depicted in FIG. 5 is exemplary. The imaging device 520 is depicted as a pole-mounted device, however other mounting configurations are possible such as curb-mounted and portable, movable mounting. The imaging device 520 may be portable and as such may be temporary in positioning. In various embodiments, each parking space may have an imaging device. The imaging device may be communicatively coupled 522 to each sensor 502 (located in a parking space to which the imaging device provides imaging coverage) to enable imaging coordination between the sensor and the imaging device such that images are taken at the appropriate time. This may be a two-way coupling. In various embodiments, the imaging device may continuously take images or may take images at pre-set time intervals. The imaging device may be communicatively coupled to the gateway and to the server using two-way wired and/or wireless communications paths 521.

Figure 6:
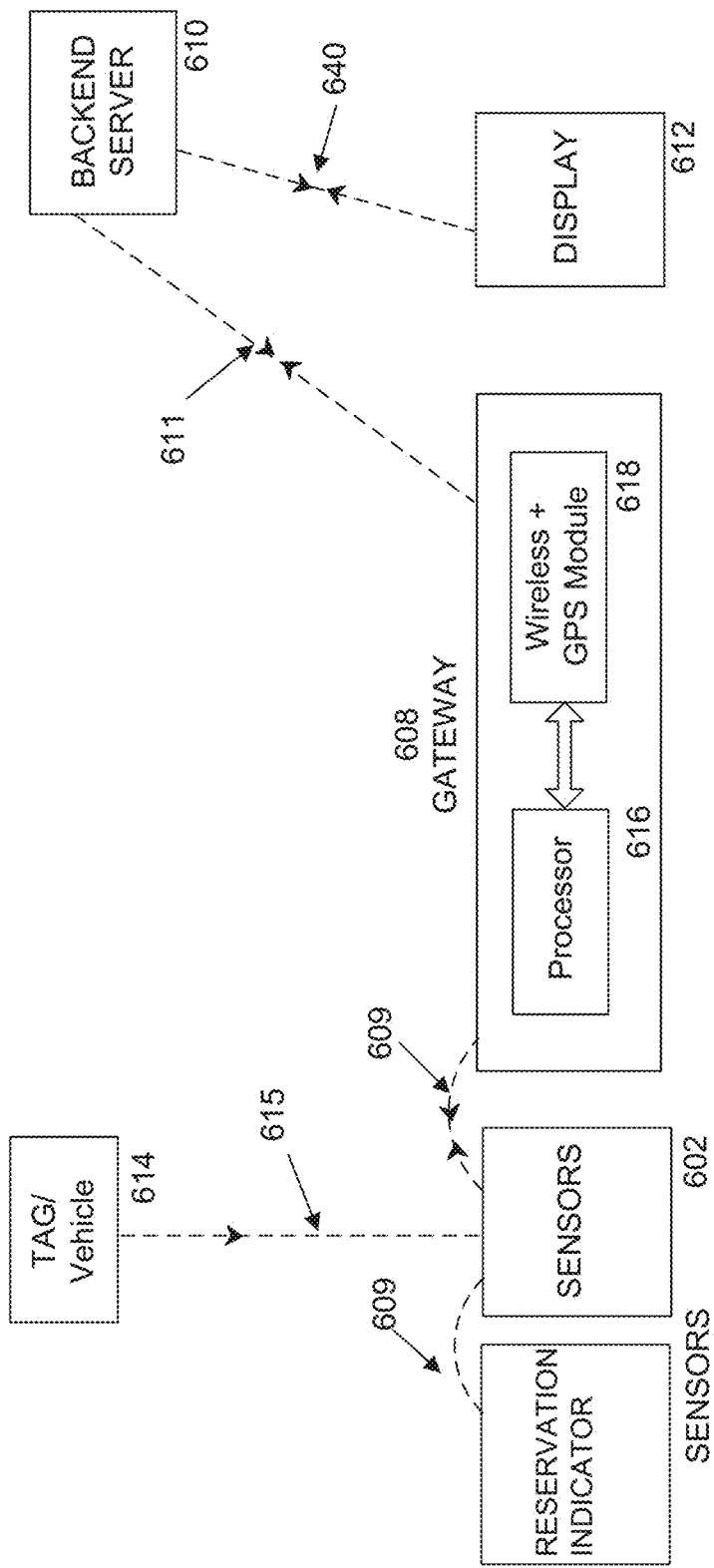
FIG. 6 depicts a block diagram parking management components in accordance with an exemplary embodiment.

FIG. 6 depicts a block diagram of communication between devices in the parking system 600 (similar to parking system 500 of FIG. 5) in accordance with an exemplary embodiment including in-vehicle devices or tags, sensors, gateway, guidance displays, and a backend computer. FIG. 6 may reference same or similar components of FIG. 5.A tag (or other in-vehicle device) 614 and/or vehicle 614 may be sensed by a sensor 602 at 615. The sensor may communicate with the gateway 608. The gateway may have a processor 616 and a GPRS/GPS module 618. The gateway may communicate with the server 610. The gateway may communicate (640) with the display 612. The communication 640 with the display may be wired or wireless and may be two-way communication. In various embodiments, the server 610 may communicate with the display in addition to or in lieu of the gateway communicating with the display.

The various wireless communications may be routed through an intermediate point, such as a relay or router, in various embodiments.

Figure 7:
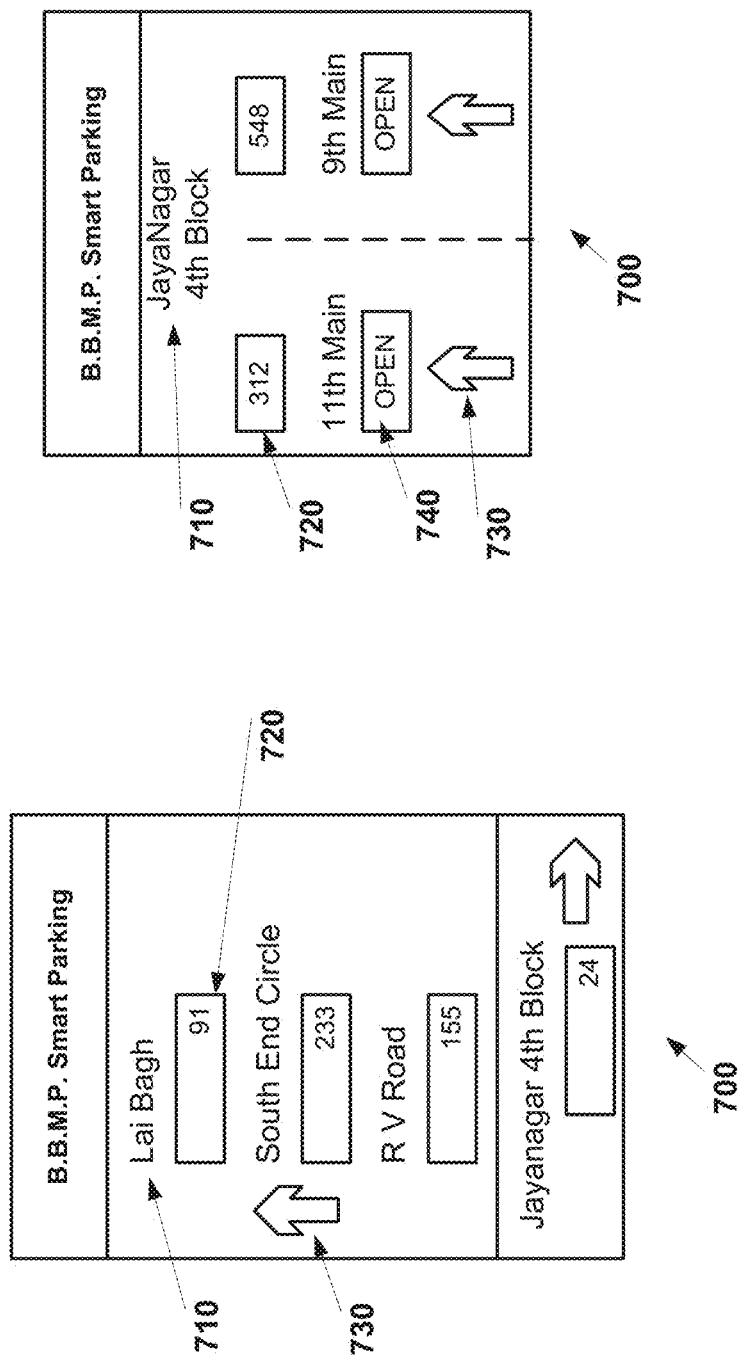
FIG. 7 depicts variable dynamic message signs in accordance with an exemplary embodiment.

FIG. 7 depicts one or more variable message signs 700. For example, signs 700 may include visible dynamic message signs that may be configured to provide guidance to motorists. The guidance may be provided in real-time and provided accurately. The one or more variable message signs 700 may be placed at a plurality of predetermined locations on similar or different roads, such as approach roads and/or main roads. In some examples, signs 700 may display one or more of locations 710, number of parking spaces 720, directions 730 (symbolized by an arrow indicating a particular direction). In some examples, signs 700 may display a status of parking availability 740, such as OPEN.

Figure 8:
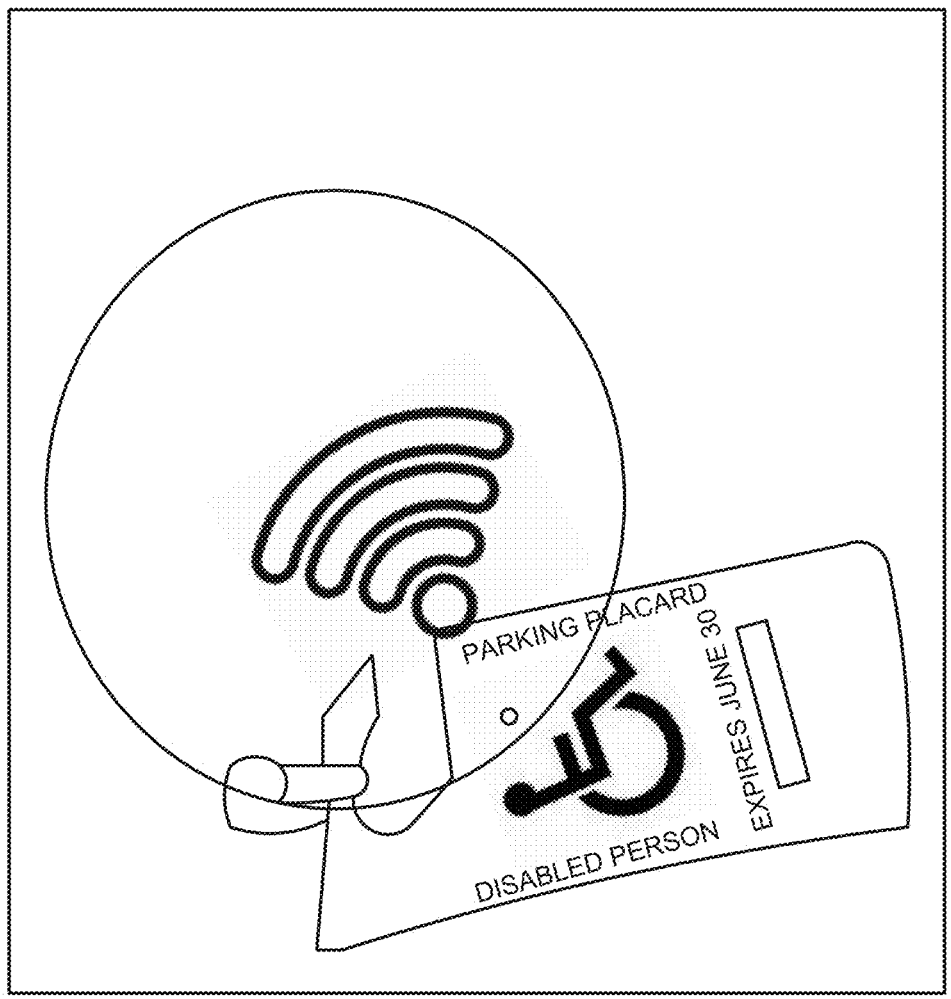
FIG. 8 depicts a battery operated in-vehicle device in the form factor of a parking permit in accordance with an exemplary embodiment.

FIG. 8 depicts one or more battery operated in-vehicle device in the form factor of a parking permit 800 or attached to a parking permit.

Figure 9:
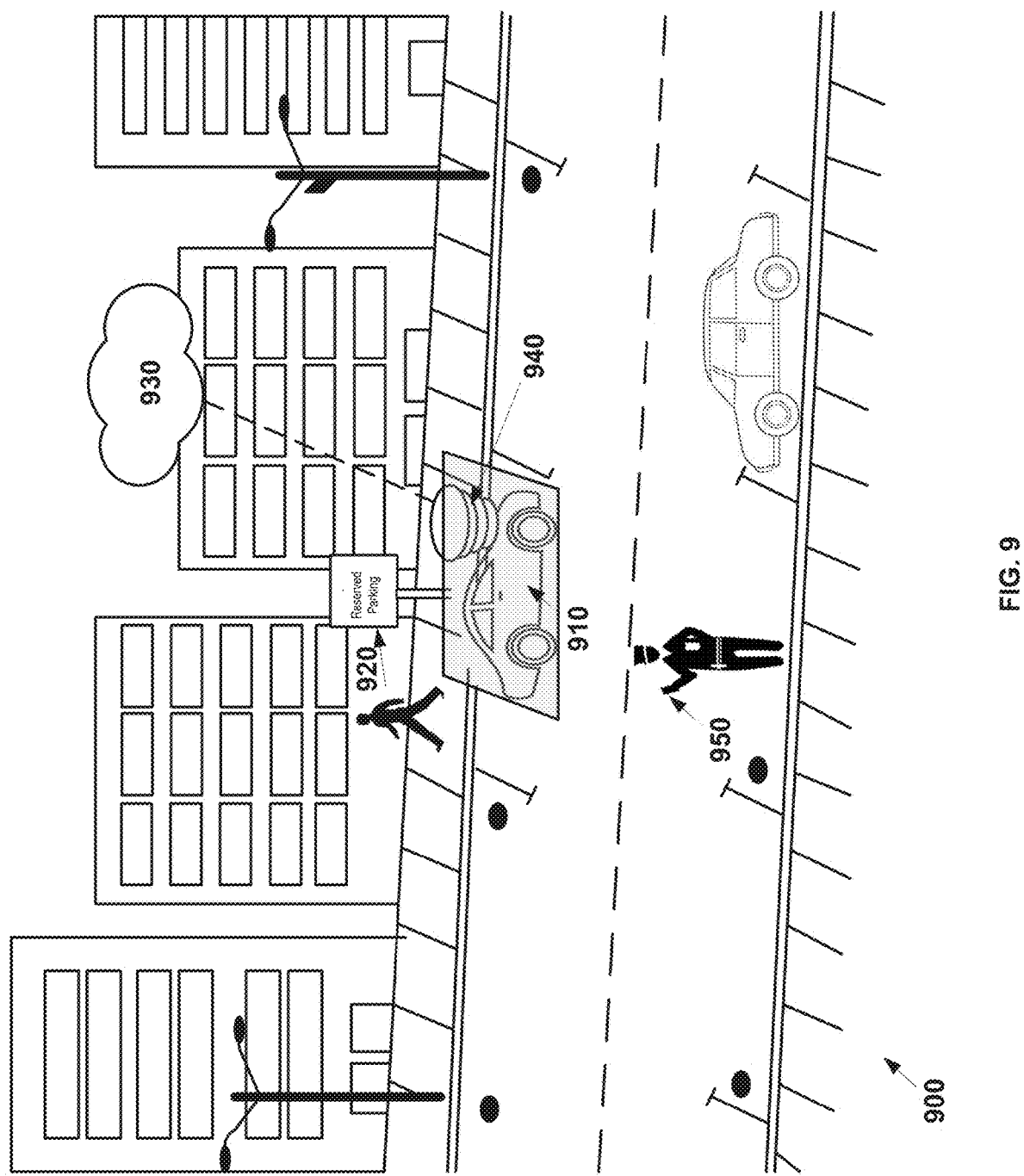
FIG. 9 depicts a schematic block diagram of a first option for reserved parking in accordance with an exemplary embodiment.

In some embodiments, there may be at least two options for reserved spaces: For example, FIG. 9 depicts a first option of reserved parking. In the first option, a reserved sign that does not identify the specific reservation holder may be used during the period of a reservation. This may be dynamic or even static, for example, when 5-10% of spaces may be dedicated only for reserved parking. In this manner, reserved inventory may be periodically adjusted (e.g. increase or decrease) based on demand of reserved and general spaces. More particularly, sensor data for all reserved and general spaces may provide occupancy and use patterns. Another option may be to use flex spaces wherein a particular space may be used for reserved parking only when needed. When the space is not reserved or reservations capability is turned off, the indicator may display a default message or be simply turned off.

in some embodiments, for example, a user or vehicle 910 may approach a reserved parking space 920. Through an application, or automatically through a chip, a user may confirm when the vehicle 910 has arrived at the reserved parking space. Sensor data and the confirmation are transmitted to a system, such as a data management system, for payment and tracking. In sonic examples, the system may comprise a cloud or cloud-based data management system 930. The one or more sensors (similar to the sensors described above), such as curb-mounted sensors 940, may be configured to detect when the vehicle 910 enters and/or exits the reserved parking space 920. The one or more sensors 940 may be configured to detect the chip or application if present. Illegal parking by the vehicle 910 may be sensed and sent to a handheld device 950 for contactless policing. For example, an enforcement individual or officer may approach the vehicle and take a picture, by the handheld device 950, for contactless policing. Evidence, including pictures, sensor information, and/or vehicle fingerprints, may be made available for noticing and/or ticketing. Full sensor data may be made available for adjudication and workflow support, and repeat offenders may be clamped and/or towed. As a consequence, this smart parking process provides for accurate, real-time data for citizen convenience, city efficiencies, and additional revenues, including mobile and in-car guidance, reservation choices, and enforcement efficiency. With respect to mobile and in-car guidance, real-time data may be made available to reduce the circling of the motorists to find available parking. A fee, such as a user paid convenience fee, may be assessed and may be application-based, linked to virtual wallets or prepaid cards.

Figure 10:
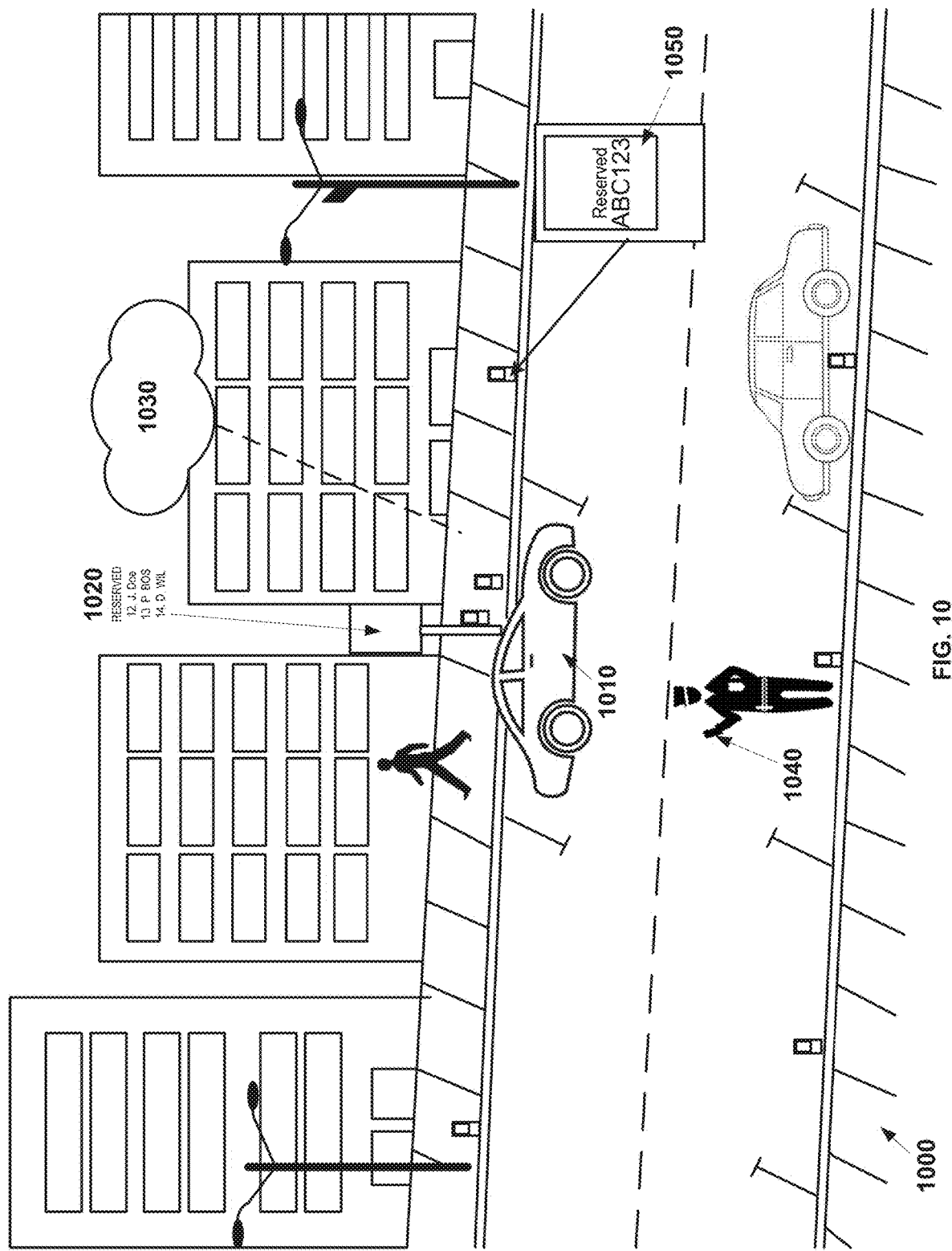
FIG. 10 depicts a schematic block diagram of another option for reserved parking in accordance with an exemplary embodiment.

In another example, FIG. 10 depicts a second option of reserved parking 1000. FIG. 10 may reference same or similar components of FIG. 9. For example, a user or vehicle 1010 may approach a reserved parking space. Through an application, or automatically through a chip, a user may confirm when the vehicle 1010 has arrived at the reserved parking space. Sensor data and the confirmation are transmitted to a system, such as a data management system, for payment and tracking. In some examples, the system may comprise a cloud or cloud-based data management system 1030. The one or more sensors may be configured to detect when the vehicle 1010 enters and/or exits the reserved parking space. Display 1020 may display reservation status for one or more individuals, such as J. DOE, P. BOS, D. WIL, etc. The one or more sensors may be configured to detect the chip or application if present. Illegal parking by the vehicle 1010 may be sensed and sent to a handheld device 1040 for contactless policing. For example, an enforcement individual or officer may approach the vehicle and take a picture, by the handheld device 1040, for contactless policing. A pole-mounted reservation indicator combined with a sensor may indicate or display 1050 whether or not the parking space is reserved, for whom the parking space is reserve, for example ABC 123.

Figure 11:
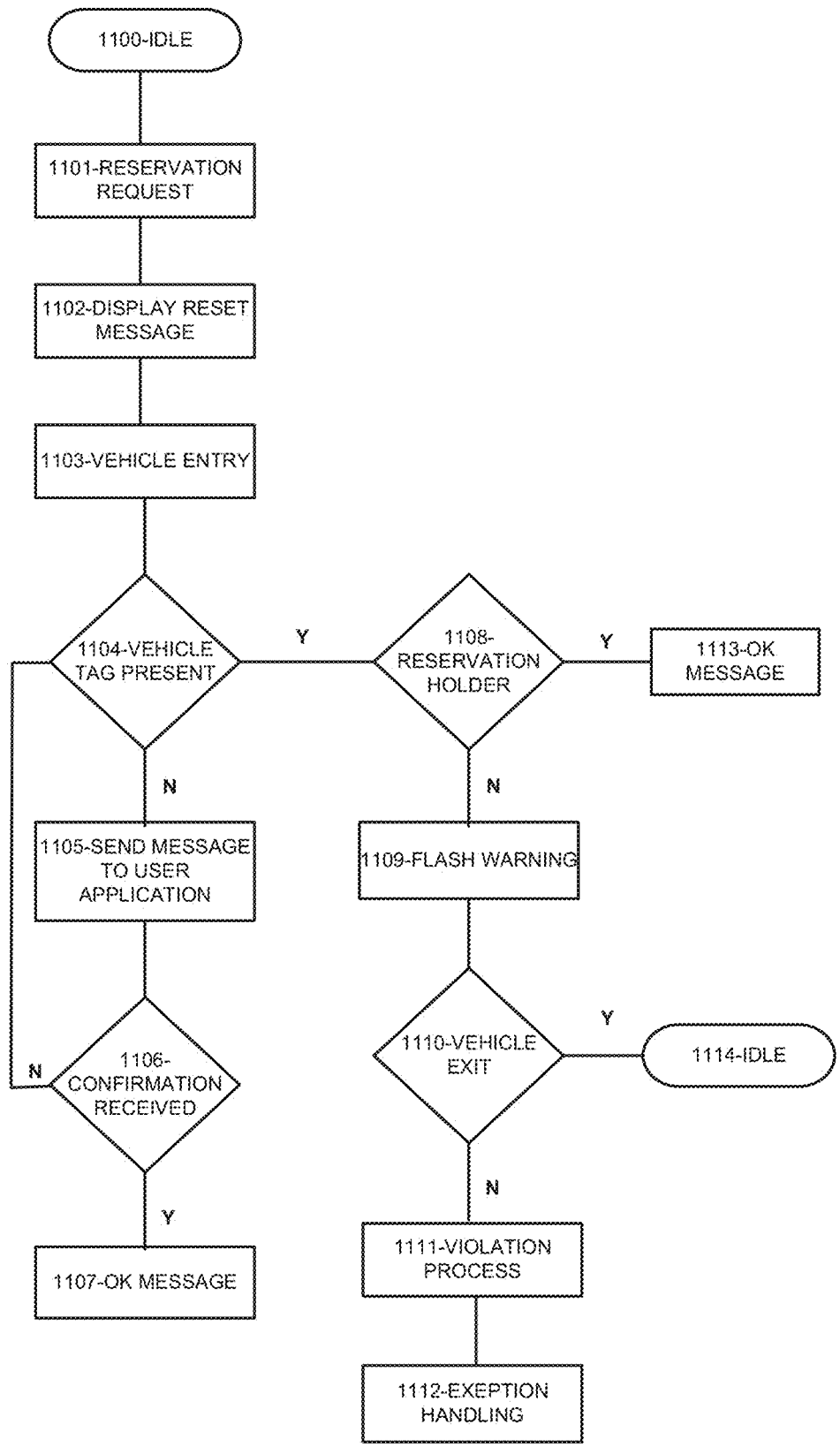
FIG. 11 depicts a flowchart of a reservation indicator in accordance with an exemplary embodiment. At block 1100, the method may begin as being in an idle state. At block 1101, a reservation request (as described herein) may be generated and transmitted. At block 1102, a reset message may be displayed on the reservation indicator. At block 1103, a vehicle may enter or approach entry (as described herein). At block 1104, in the event a tag (as described herein) of the vehicle is present, a reservation holder at block 1108 is determined (as described herein). If the reservation holder of block 1108 is correct (as described herein), an OK message may be displayed at block 113. In the event a tag of the vehicle is not present, a message is transmitted (as described herein) to a user at block 1105. At block 1106, if no confirmation as described herein) is received from the user, responsive to the transmitted message, the method may return to determine if the vehicle tag is present at 1104 or send another message to user at block 1105. If a confirmation is received from the user, the reservation indicator may display an OK message at block 1107. If the reservation holder is not correct, a flash warning (as described herein) may be generated and transmitted at block 1109. If the vehicle exits at block 1110, the reservation indicator may become idle at block 1114. If the vehicle does not exit at block 1111, a violation process may be triggered (as described herein). At block 1112, an exception of handling or managing the violation may be processed (as described herein).

FIG. 11 depicts a flowchart of a reservation indicator in accordance with an exemplary embodiment.

Figure 12A:
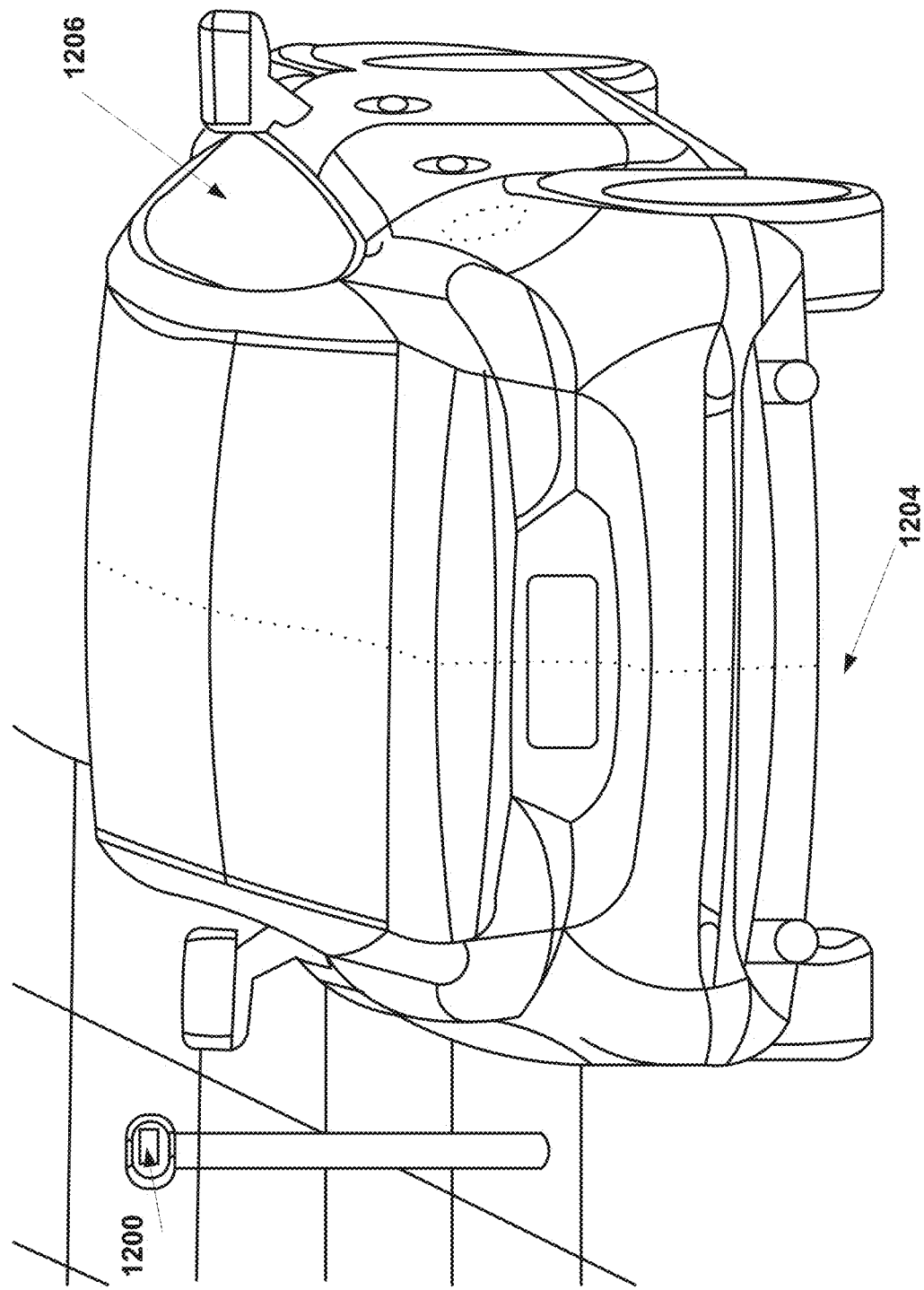
FIG. 12A depicts a reservation indicator of a vehicle in a parking space in accordance with an exemplary embodiment.

FIG. 12A depicts a reservation indicator 1200 in a parking space 1204 for vehicle 1206.

Figure 12B:
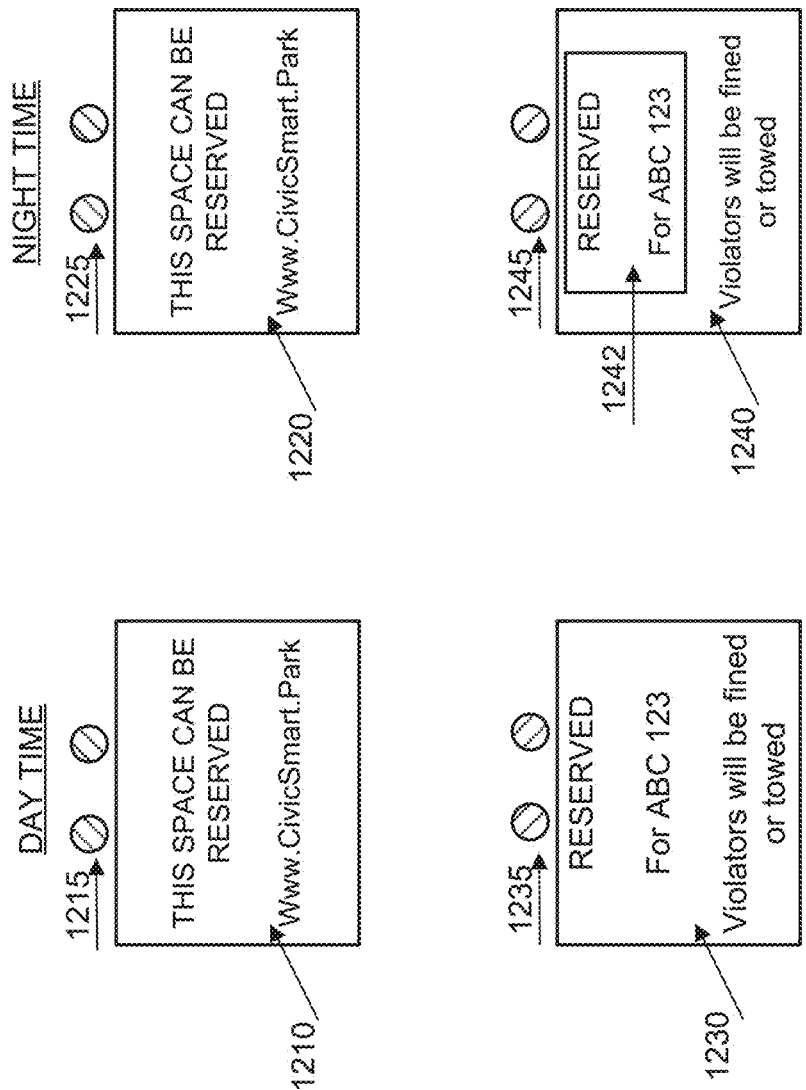
FIGS. 12B-12D depict various display states of a reservation indicator in a parking space in accordance with an exemplary embodiment.

FIG. 12B depicts display states of a reservation indicator in a parking space. For example, during day time, if no reservation has been made, display 1210 may indicate that the space is available for reservation and one or more LED indicators 1215 positioned at a location near display 1210. In addition, the LED indicators 1215 may blink green in a slow-flash operation. For example, during night time, if no reservation has been made, display 1220 may indicate that the space is available for reservation and one or more LED indicators 1225 positioned at a location near display 1220. In addition, the LED indicators 1225 may blink green in a slow-flash operation. In other examples, during day time, if the parking space is reserved or vacant (waiting for reservation holder), display 1230 may indicate that the space is reserved, for example for ABC 123, and one or more LED indicators 1235 positioned at a location near display 1220. In addition, the LED indicators 1235 may blink red in a medium-flash operation. In other examples, during night time, if the parking space is reserved or vacant (waiting for reservation holder), display 1240 may indicate that the space is reserved, for example for ABC 123, and one or more LED indicators 1245 positioned at a location near display 1240. In addition, the LED indicators 1245 may blink red in a medium-flash operation, and a portion 1242 of display 1240, such as a top screen, is backlit red steady on at night.

Figure 12C:
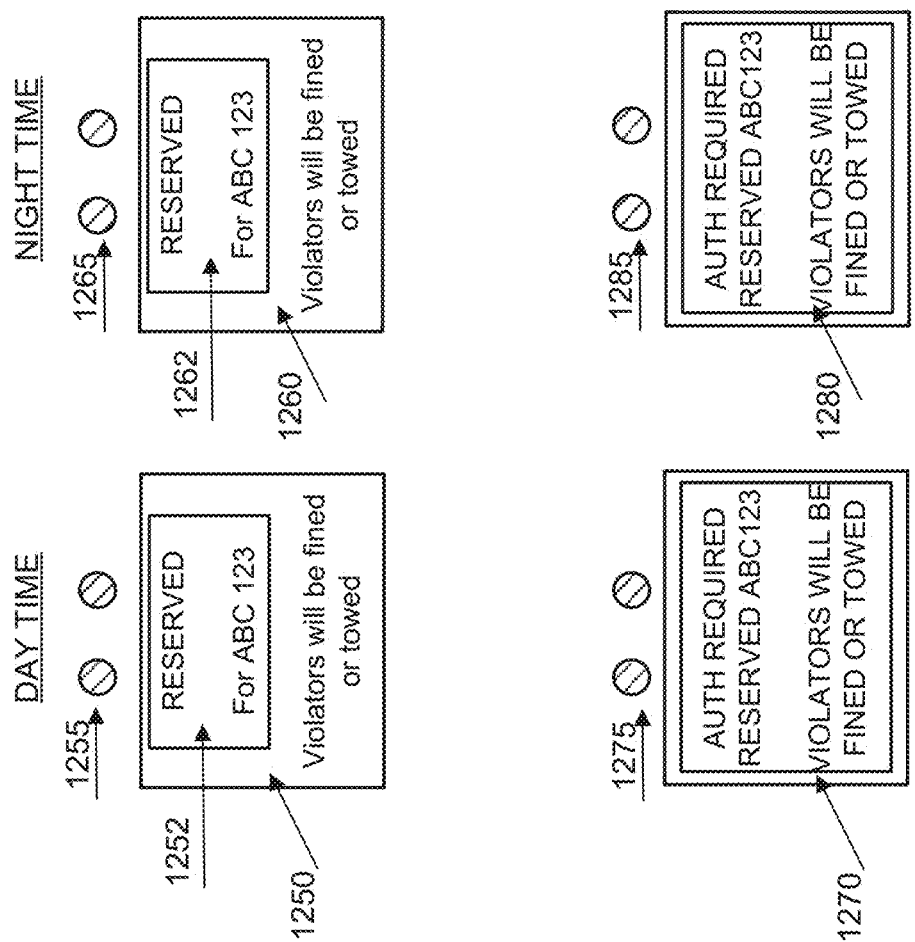

FIG. 12C depicts display states of a reservation indicator in a parking space. For example, upon entry of a new vehicle into a reserve space (as detected by the one or more sensors described herein) until after a time, such as 15 seconds, after arrival, one or more LED indicators 1255 may blink red (fast blink), and a backlight 1252 flashes red (medium flash) for day time and display 1250 may indicate reservation for ABC 123. Similarly for night time, upon entry of a new vehicle into a reserve space (as detected by the one or more sensors described herein) until after a time, such as 15 seconds, after arrival, one or more indicators 1265 may blink red (fast blink), and a backlight 1262 flashes red (medium flash) for night time and display 1260 may indicate reservation for ABC 123. In other examples, for day time, when no confirmation is received and/or a possible violation exists from t+15 till t+30 seconds after arrival of vehicle, display 1270 may indicate that authorization is required and/or the space is reserved for ABC 123, in which backlight flashes red (fast flash) and one or more LED indicators 1275 blink red (fast blink) in addition to a sound. In other examples, for night time, when no confirmation is received and/or a possible violation exists from t+15 till t+30 seconds after arrival of vehicle, display 1280 may indicate that authorization is required and/or the space is reserved for ABC 123, in which backlight flashes (fast flash) and one or more LED indicators 1285 blink red (fast blink) in addition to a sound.

Figure 12D:
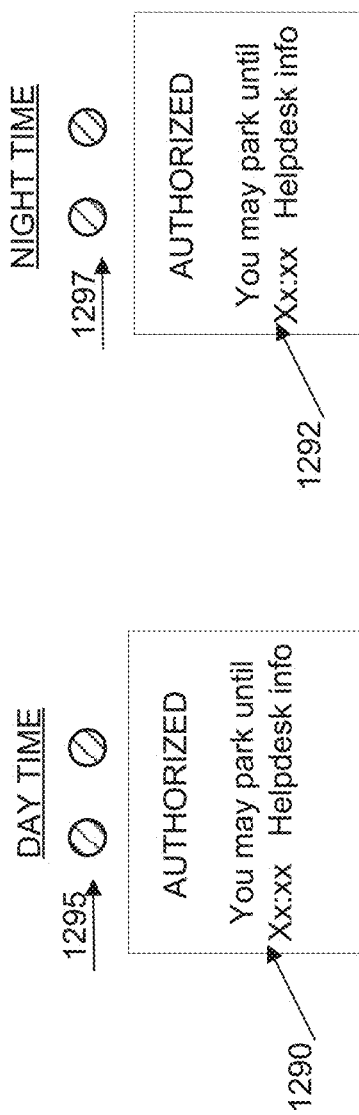

FIG. 12D depicts display states of a reservation indicator in a parking space. For example, during day time, when a confirmation has been received by the reservation holder, display 1290 may display that the space is authorized and blink green (slow blink) and one or more LED indicators 1295 may blink green (medium blink) for 15 seconds after the confirmation. In other examples, during night time, when a confirmation has been received by the reservation holder, display 1292 may display that the space is authorized and blink green (slow blink) and one or more LED indicators 1297 may blink green (medium blink) for 15 seconds after the confirmation. Options for confirmation may include one or more of automatic confirmation via a wireless permit, automatic confirmation via an application (based on GPS or Bluetooth), and manual push via an application.

The system may include one or more applications, which may comprise one or more applications for guidance, payment, and reservations. In some examples, the one or more applications may be configured to provide real-time data, such as real-time parking availability data, to reduce operations and/or motorists circling. In some examples, the one or more applications may be configured to provide payment, such as mobile payment. In sonic examples, the one or more applications may be configured to provide reservations, such as reservations support to assist in determining statuses associated with parking reservations. Indoor and/or outdoor reservations may be made for parking one or more of the multi-wheeled vehicles using, for example, an LED signboard at a parking space indicating that a particular parking space is reserved for a license plate. For example, the indication may display one or more of "Reserved for License Plate ending with 1234"; "Reserved for License Plate ABC 1234"; "Reserved for License Plate *1234"; "Reserved for John Doe"; "J. DOE", "<–J. DOE", or any other sufficiently distinctive identifier of or belonging to the multi-wheeled vehicle or the user. In some examples, a device, such as a mobile phone, and vehicle Bluetooth or Wi-Fi radio may be configured for obtaining one or more unique identifiers or sufficiently distinctive identifiers to distinguish between vehicles and users. The one or more applications for reservation may be used in garages, outdoor lots, shopping malls, indoor lots, multi-story lots, on-street spaces (selected spaces or every space), etc. Signage may be at least partially static and/or at least partially dynamic. In some examples, the signboard may be solar or battery powered, and may be combined with at least one of audible alerts and voice guidance. The signboard may be combined with one or more mobile applications for positive confirmation by an authorized user. The signboard may be combined with one or more cameras for verification. The signboard may be used for private parking, or any type of shared parking uses. In some examples, vehicle space availability may be displayed, either individually and/or aggregate, on an electronic display screen.

The same components may be used at the entrances of garages and parking lots. For example, when a vehicle pulls into an access controlled lot and stops momentarily at the entrance, the in-vehicle device may be detected by a roadside unit and the vehicle identified. A message may be displayed, for example, "Please proceed to Level 3, Space 15", and the garage door or gate may be opened. At the space, an optional indication may display "Reserved for Jane Doe" and once the car has entered the space, it may be authenticated. These scenarios are exemplary and in practice may be customized and modified to handle a large variety of parking conditions and user preferences.

In some embodiments, one or more connections including Bluetooth or WiFi, optionally with directional antennas may be employed to detect the user or vehicle at entrances or even parking spaces if the location is such that there little chance of picking up other than the intended user or vehicle.

Figure 13:
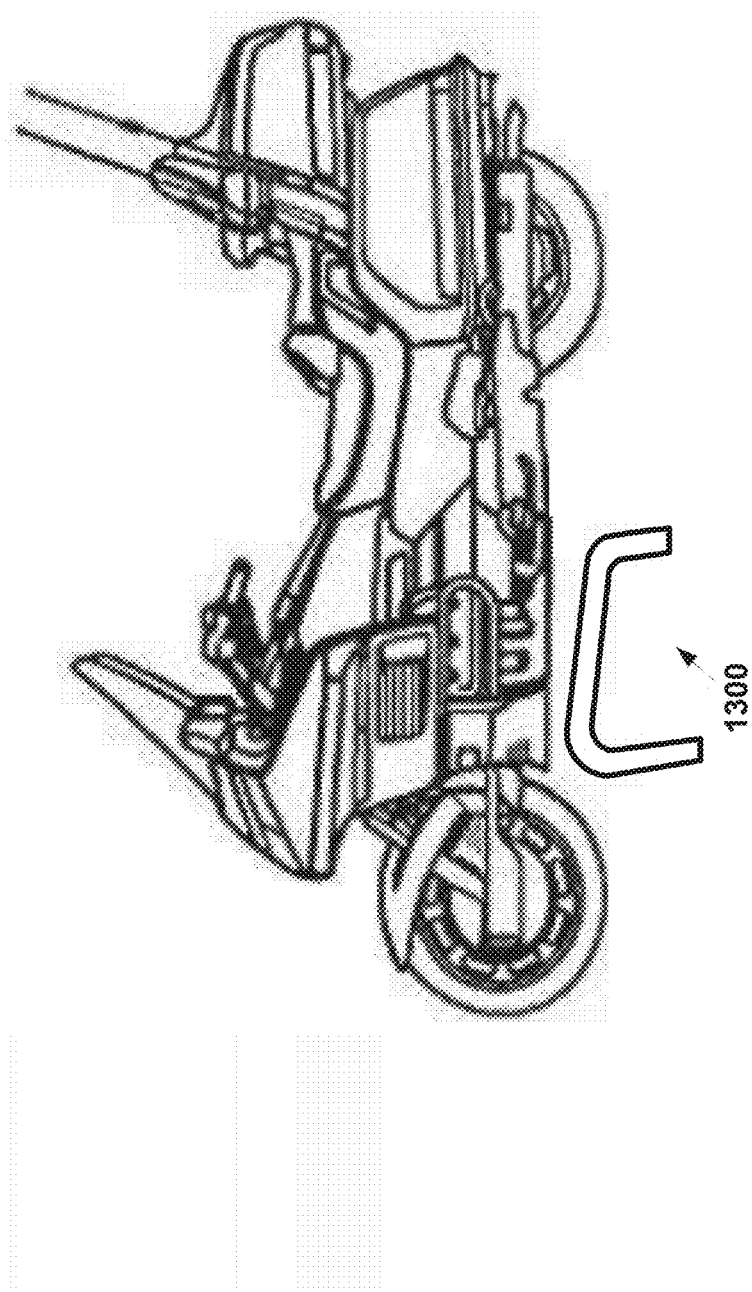
FIG. 13 depicts a sensor in accordance with an exemplary embodiment.

FIG. 13 depicts a sensor in accordance with an exemplary embodiment. For example, this figure illustrates an exemplary 2-wheeler sensor mounted in a parking separator post. As explained above, there is a demand for parking management of 2 wheelers and trucks. The systems and methods disclosed herein are also suitable for this purpose and thus detection of occupancy of a 2 wheeler space is available.

The embodiments of the present invention are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A system for managing parking, comprising:
   a fixed device comprising a sensor that is configured to detect a change in occupancy state in a parking space;
   a reservations indicator display configured to display a sufficiently unique identifier to indicate an identity of a reservation holder, situated in proximity to the parking space and configured to change responsive to a vehicle entering or exiting the parking space or upon authentication of the reservation holder in a reserved parking space or upon an accepted reservation;
   a user device including a mobile application configured to request a reservation associated with an intended parking session by inputting one or more parameters;
   one or more processors configured to provide information to the user device of the reservation holder regarding available or expected choices for parking for the intended parking session;
   the user device further configured to select, via the mobile application, a choice for parking based on the available or expected choices for parking for the intended parking session;
   the one or more processors further configured to authenticate whether a vehicle occupancy event in the reserved parking space belongs to the reservation holder for the reserved parking space;
   the one or more processors further configured to manage processing of violations and exceptions upon determining that an identity of a parked vehicle in the reserved parking space cannot be confirmed; and
   an in-vehicle device configured to automatically perform the authentication, the in-vehicle device mounted in or on an interior or an exterior of the vehicle, the in-vehicle device comprising at least one button for user input configured to initiate one or more communications between the in-vehicle device and the fixed device for the authentication, such that the at least one button, upon activation, is configured to initiate a transmission from the in-vehicle device that includes a preamble for a duration that exceeds a duty cycle of a receiver in the fixed device.

2. The system of claim 1, wherein the in-vehicle device comprises an accelerometer.

3. The system of claim 1, wherein the authentication employs a distance measurement between the in-vehicle device and the fixed device in proximity to the parking space.

4. The system of claim 3, wherein the distance measurement is derived from a direct or indirect measurement of a time of flight of a radio signal between the fixed and in-vehicle devices.

5. The system of claim 4, wherein the distance measurement comprises one or more measurements performed separately by the in-vehicle device and the fixed device.

6. The system of claim 3, wherein the authentication comprises at least one of one or more time windows based on the detected change in occupancy state and one or more time windows based on a detected change from an accelerometer and the distance measurement between the fixed and in-vehicle devices.

7. The system of claim 6, wherein an authentication status is reported by the fixed device to at least one of a central parking management system and the user device.

8. The system of claim 1, wherein the in-vehicle device includes at least one of visual and auditory indicators to inform the user device of an authentication state.

9. The system of claim 1, wherein upon the authentication, parking space information including one or more of regulations, location, and price is transmitted to the user device.

10. The system of claim 1, wherein the sensor is configured to be one or more of subterranean, surface mounted, curb face mounted, and pole mounted.

11. The system of claim 10, wherein the sensor comprises a radar sensor using at least one timing signal with a duration of less than 10 nanoseconds or rise or fall times of less than 3 nanoseconds.

12. The system of claim 1, wherein at least one of the reservations indicator display and the sensor comprises a solar panel.

13. The system of claim 1, wherein at least one of the reservations indicator display and the sensor are coupled to a payment device.

14. The system of claim 1, wherein the reservations indicator display comprises at least one of an RFID tag, an NFC tag, 1D, 2D or 3D barcode configured to inform the user device of a specific location.

15. The system of claim 1, wherein the reservations indicator display comprises a payment facilitation processor for processing contactless wireless payments.

16. The system of claim 1, wherein the one or more processors are configured to receive the one or more parameters via input from the user device and provide the information to the reservation holder of the user device via automated natural language voice interfaces.

17. A system for managing parking, comprising:
a battery-operated fixed device comprising a sensor that is configured to detect a change in occupancy state in a parking space;
a reservations indicator display configured to display a sufficiently unique identifier to indicate an identity of a reservation holder, situated in proximity to the parking space and configured to change responsive to a vehicle entering or exiting the parking space or upon authentication of the reservation holder in a reserved parking space or upon an accepted reservation;
a user device including a mobile application configured to request a reservation associated with an intended parking session by inputting one or more parameters;
one or more processors configured to provide information to the user device of the reservation holder regarding available or expected choices for parking for the intended parking session;
the user device further configured to select, via the mobile application, a choice for parking based on the available or expected choices for parking for the intended parking session;
the one or more processors further configured to authenticate whether a vehicle occupancy event in the reserved parking space belongs to the reservation holder for the reserved parking space;
the one or more processors further configured to manage processing of violations and exceptions upon determining that an identity of a parked vehicle in the reserved parking space cannot be confirmed;
an in-vehicle device configured to automatically perform the authentication, the in-vehicle device mounted in or on an interior or an exterior of the vehicle, the in-vehicle device comprising at least one button for user input configured to initiate one or more communications between the in-vehicle device and the battery-operated fixed device for the authentication, such that the at least one button, upon activation, is configured to initiate a transmission from the in-vehicle device that includes a preamble for a duration that exceeds a duty cycle of a receiver in the battery-operated fixed device; and
a solar panel configured to charge the battery.

18. The system of claim 17, further comprising an imaging device configured to determine parking validity of the parked vehicle and detect the violations by capturing license plate information of the vehicle entering or exiting the parking space or when the vehicle is stationary in the parking space.

* * * * *